(12) United States Patent
Kim et al.

(10) Patent No.: US 11,212,810 B2
(45) Date of Patent: Dec. 28, 2021

(54) METHOD FOR PERFORMING SCHEDULING IN WIRELESS COMMUNICATION SYSTEM AND DEVICE THEREFOR

(71) Applicants: LG ELECTRONICS INC., Seoul (KR); KOREA ADVANCED INSTITUTE OF SCIENCE AND TECHNOLOGY, Daejeon (KR)

(72) Inventors: Heejin Kim, Seoul (KR); Changho Suh, Daejeon (KR); Jaewoong Cho, Daejeon (KR); Jiwon Kang, Seoul (KR)

(73) Assignees: LG Electronics Inc., Seoul (KR); Korea Advanced Institute of Science and Technology, Daejeon (KR)

( * ) Notice: Subject to any disclaimer, the term of this patent is extended or adjusted under 35 U.S.C. 154(b) by 50 days.

(21) Appl. No.: 16/467,560

(22) PCT Filed: Jan. 12, 2017

(86) PCT No.: PCT/KR2017/000408
§ 371 (c)(1),
(2) Date: Jun. 7, 2019

(87) PCT Pub. No.: WO2018/110765
PCT Pub. Date: Jun. 21, 2018

(65) Prior Publication Data
US 2020/0008208 A1  Jan. 2, 2020

(30) Foreign Application Priority Data

Dec. 16, 2016  (KR) .......................... 10-2016-0172602

(51) Int. Cl.
*H04W 72/08* (2009.01)
*H04W 4/02* (2018.01)
(Continued)

(52) U.S. Cl.
CPC .......... *H04W 72/082* (2013.01); *H04W 4/027* (2013.01); *H04W 8/08* (2013.01); *H04W 64/00* (2013.01); *H04W 72/1231* (2013.01)

(58) Field of Classification Search
CPC ..... H04W 72/082; H04W 4/027; H04W 8/08; H04W 64/00; H04W 72/1231; H04W 88/08; H04J 11/005; H04B 7/0413
See application file for complete search history.

(56) References Cited

U.S. PATENT DOCUMENTS

| 2011/0110270 A1* | 5/2011 | Leng | ..................... H04W 84/18 370/254 |
| 2011/0151872 A1* | 6/2011 | Kwon | ................. H04W 72/048 455/435.2 |

(Continued)

FOREIGN PATENT DOCUMENTS

| KR | 1020120088283 | 8/2012 |
| KR | 1020150016875 | 2/2015 |

(Continued)

OTHER PUBLICATIONS

Soret, Beatriz et al., "Interference Coordination for Dense Wireless Networks," IEEE Communications Magazine, vol. 53, Issue 1, Jan. 16, 2015, see pp. 104-107.

*Primary Examiner* — Jae Y Lee
*Assistant Examiner* — Mohammed M Murshid
(74) *Attorney, Agent, or Firm* — Dentons US LLP

(57) ABSTRACT

A method for processing, by a base station, an interference in a wireless communication system includes determining a first base station group and a second base station group based on network topology information, determining a first precoder vector for the first base station group and a second precoder vector for the second base station group, the first precoder vector being linearly independent of the second precoder vector, and transmitting the first precoder vector (Continued)

and a first decoder vector to the first base station group and transmitting the second precoder vector and a second decoder vector to the second base station group, wherein the first decoder vector is included in a null space of the second precoder vector, and the second decoder vector is included in a null space of the first precoder vector.

18 Claims, 16 Drawing Sheets

(51) Int. Cl.
*H04W 8/08* (2009.01)
*H04W 64/00* (2009.01)
*H04W 72/12* (2009.01)

(56) References Cited

U.S. PATENT DOCUMENTS

| | | | |
|---|---|---|---|
| 2011/0177834 A1* | 7/2011 | Shin | H04L 25/03343 455/501 |
| 2012/0114062 A1* | 5/2012 | Zhang | H04L 5/0073 375/285 |
| 2013/0310068 A1* | 11/2013 | Fischer | G01S 19/05 455/456.1 |
| 2014/0106765 A1* | 4/2014 | Cao | H04W 72/10 455/452.1 |
| 2014/0140317 A1* | 5/2014 | Mobasher | H04B 7/024 370/330 |
| 2014/0269313 A1 | 9/2014 | Liu et al. | |
| 2015/0271687 A1* | 9/2015 | Fechtel | H04L 5/00 370/252 |
| 2015/0318944 A1* | 11/2015 | Wigren | H04W 36/0094 370/230 |
| 2015/0381248 A1* | 12/2015 | Khojastepour | H04L 5/0048 375/267 |
| 2017/0094672 A1* | 3/2017 | Yerramalli | H04W 24/10 |
| 2017/0324623 A1* | 11/2017 | Yang | H04W 74/08 |

FOREIGN PATENT DOCUMENTS

| KR | 1020150033537 | 4/2015 |
|---|---|---|
| KR | 101670946 | 10/2016 |

* cited by examiner

[Figure 1]
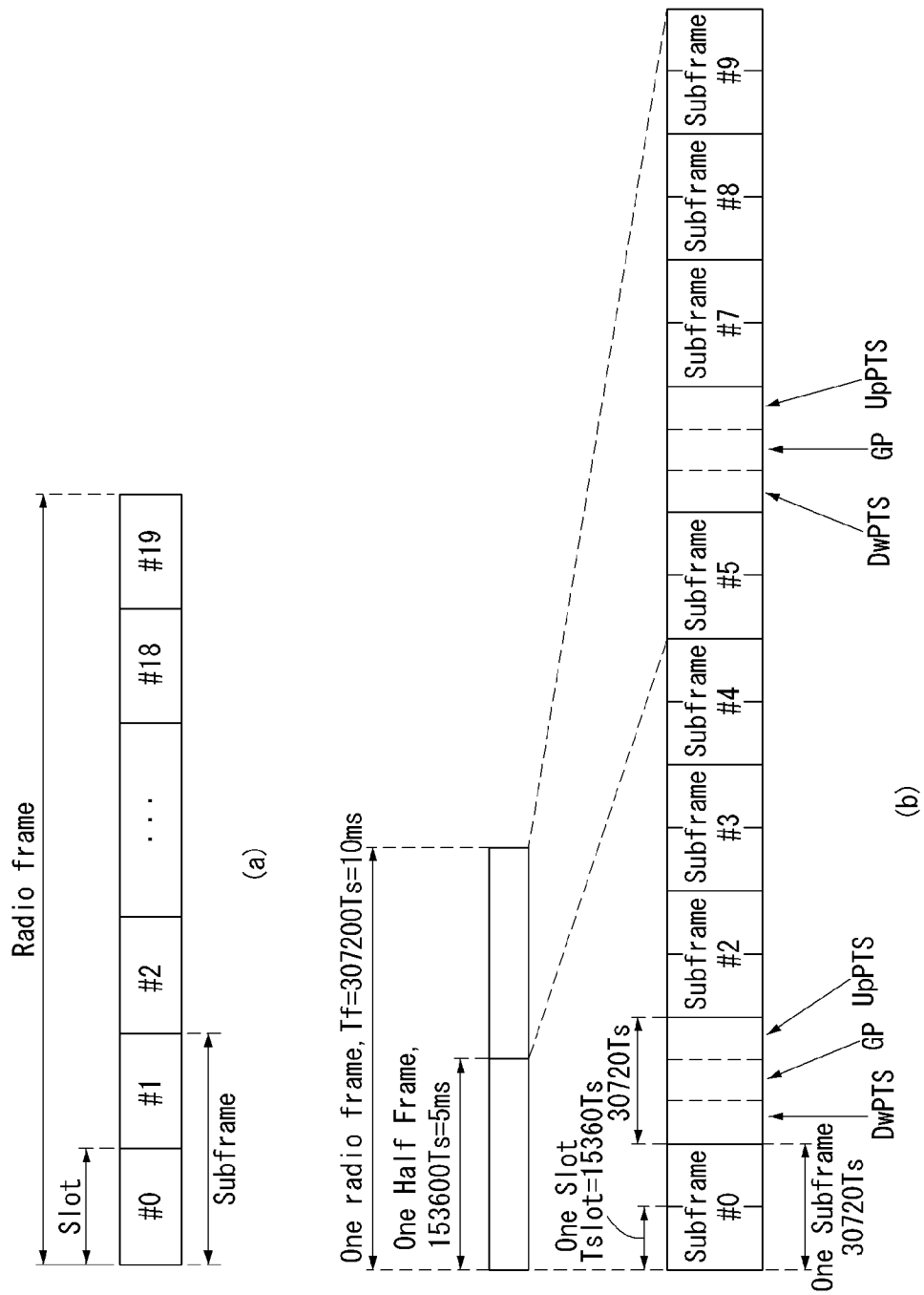

【Figure 2】
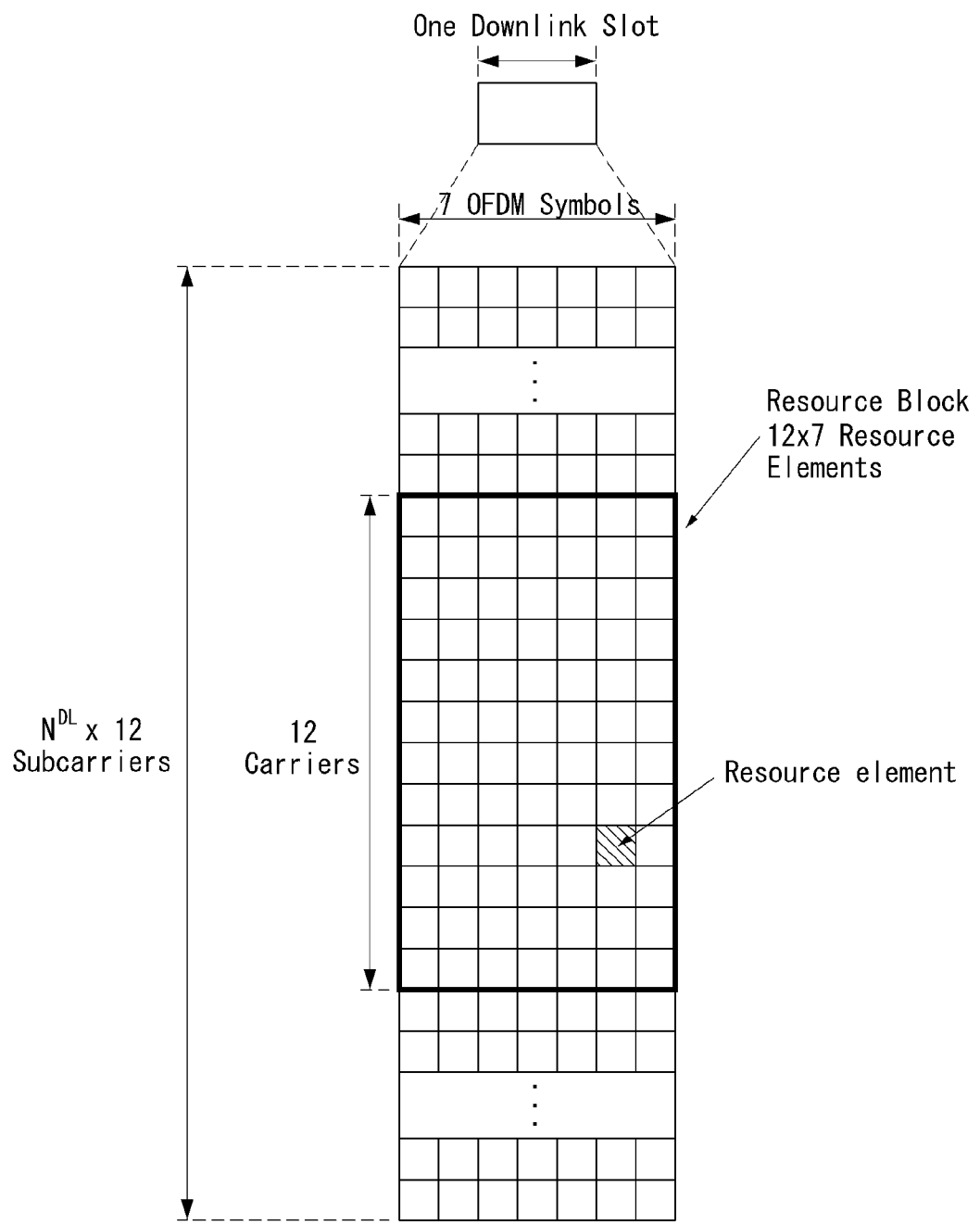

[Figure 3]
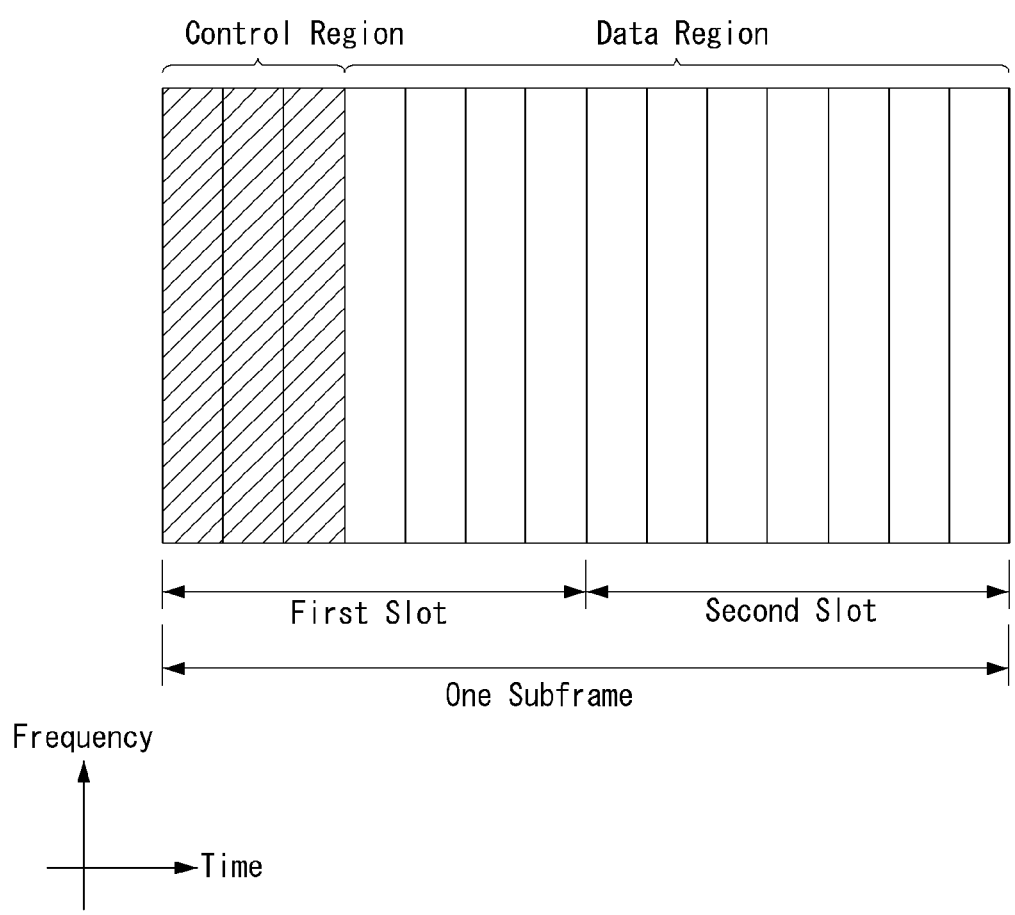

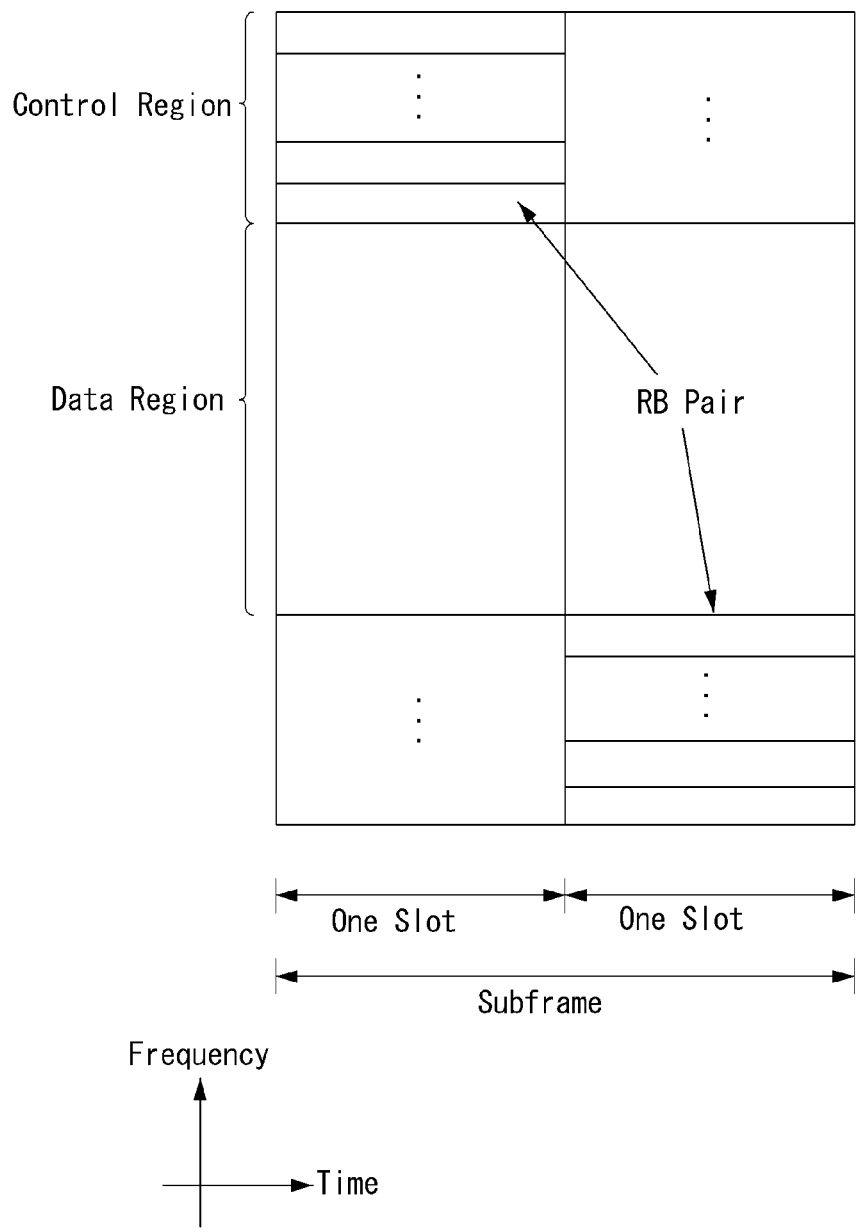

[Figure 5]
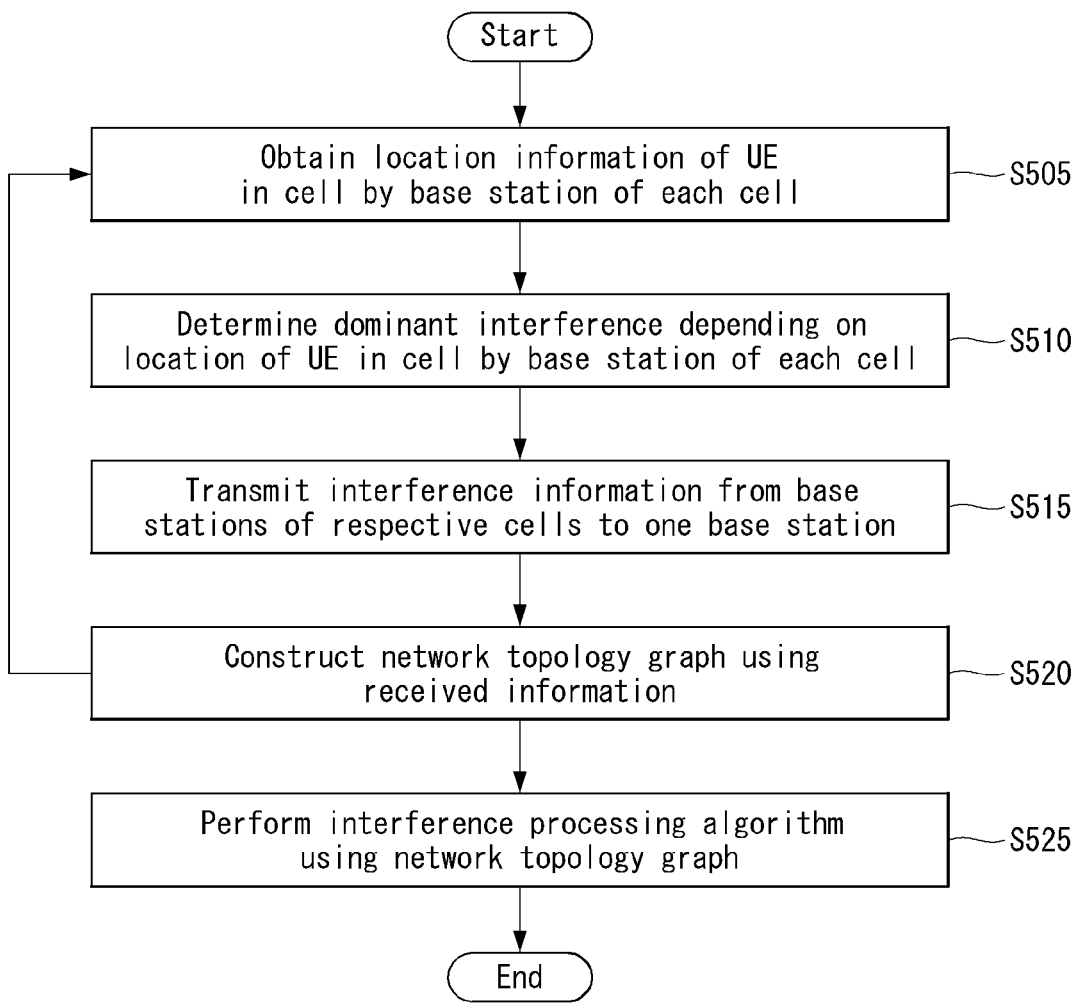

[Figure 6]
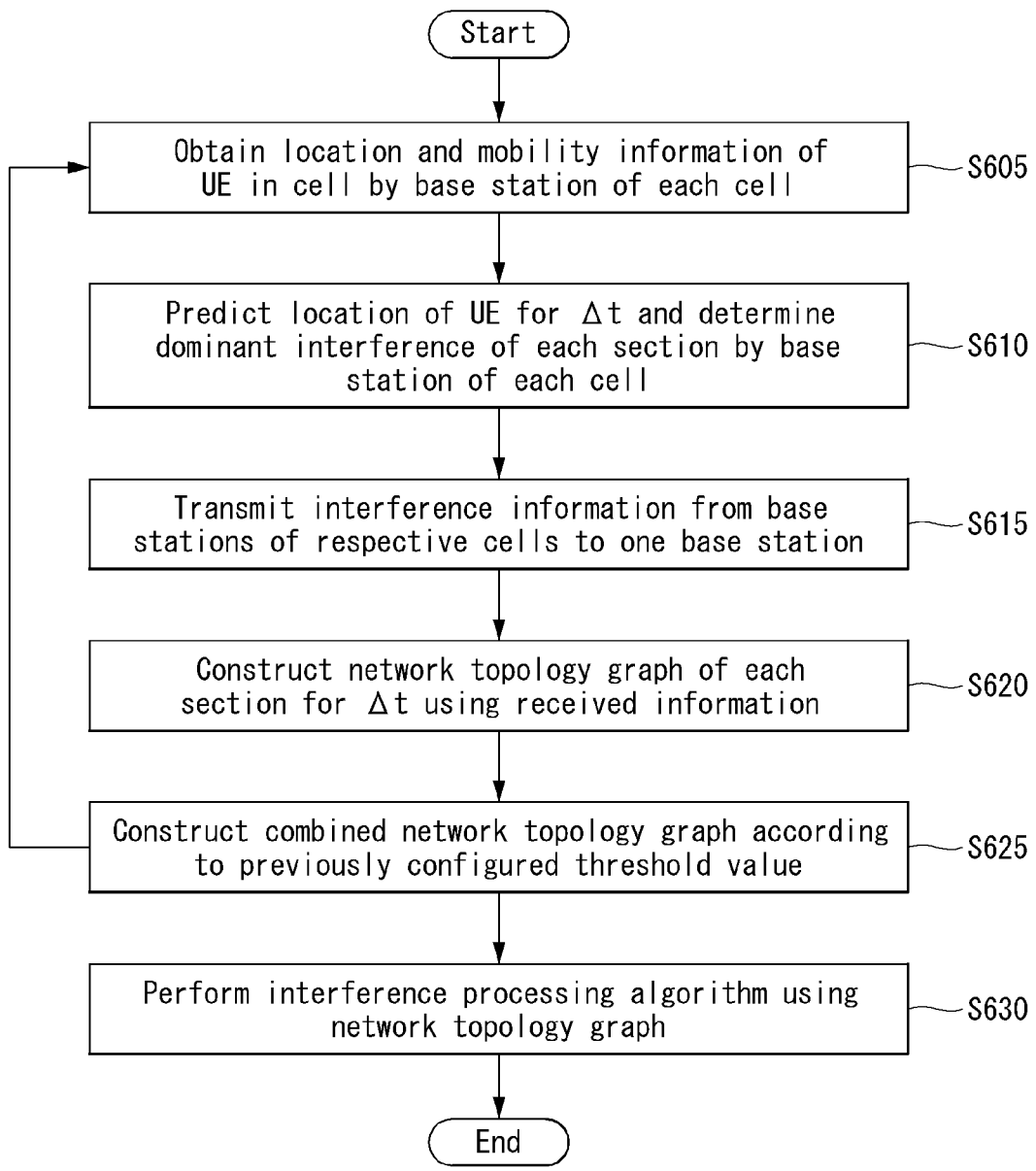

[Figure 7]
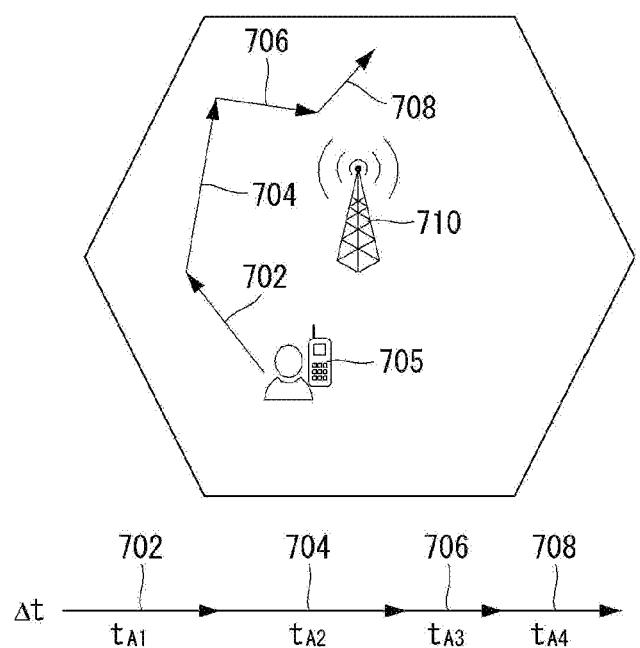

【Figure 8】
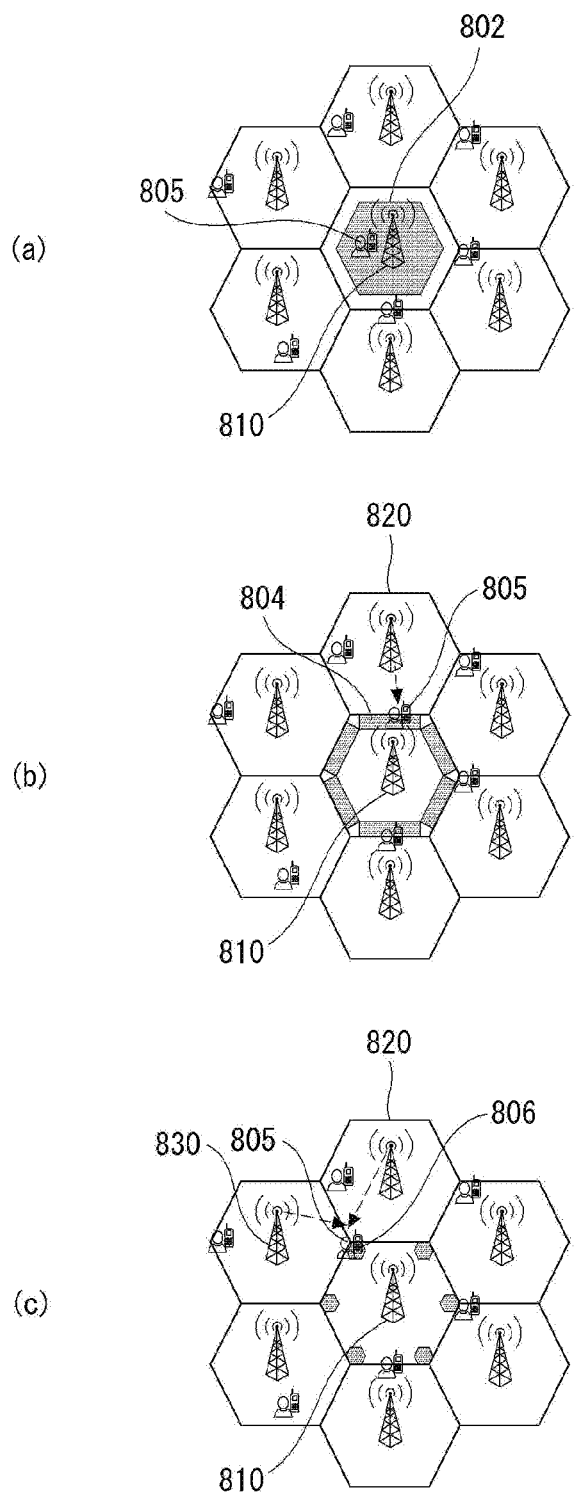

[Figure 9]
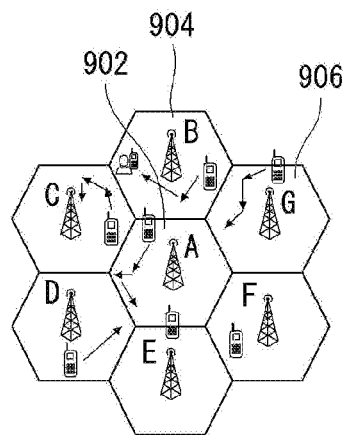
(a)
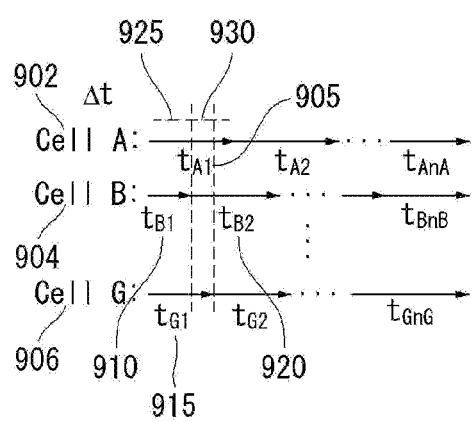
(b)
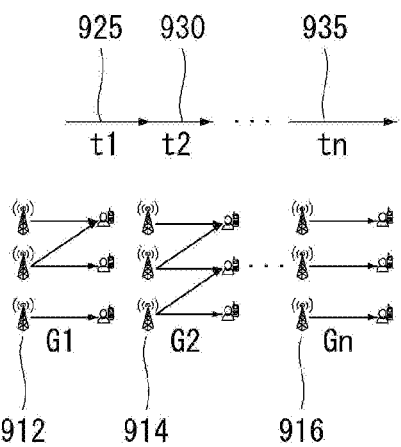
(c)

【Figure 10】
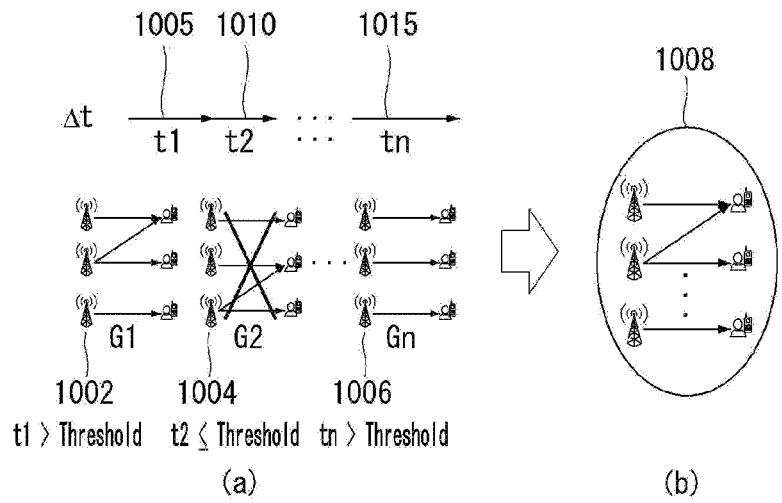
【Figure 11】
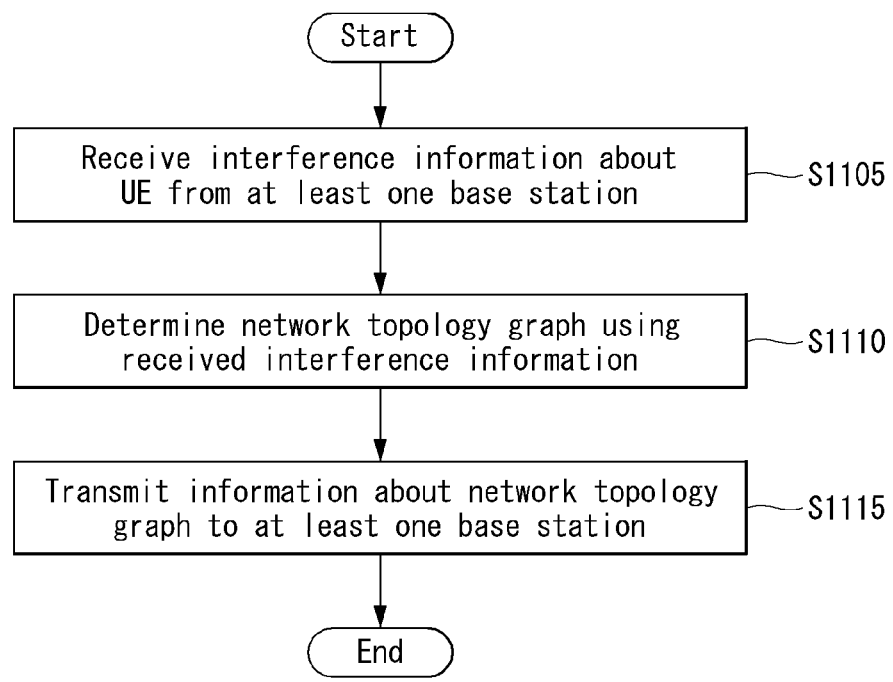

[Figure 12]
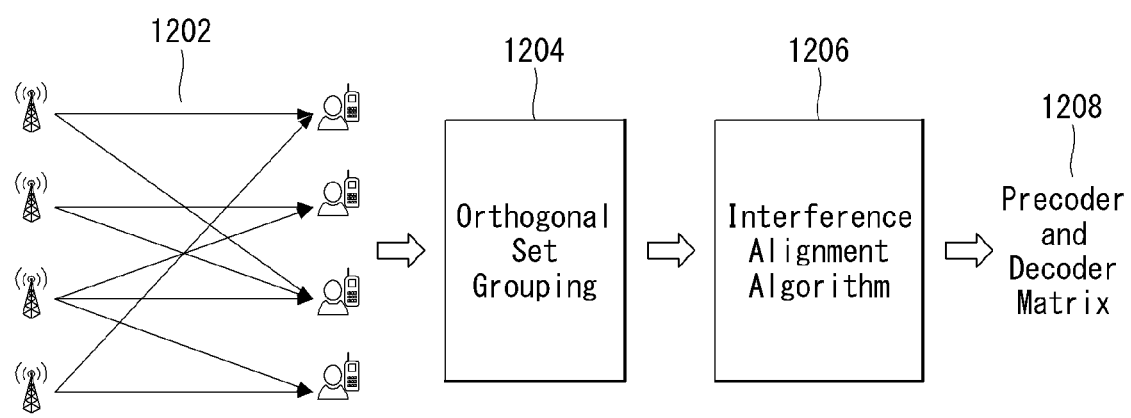

【Figure 13】
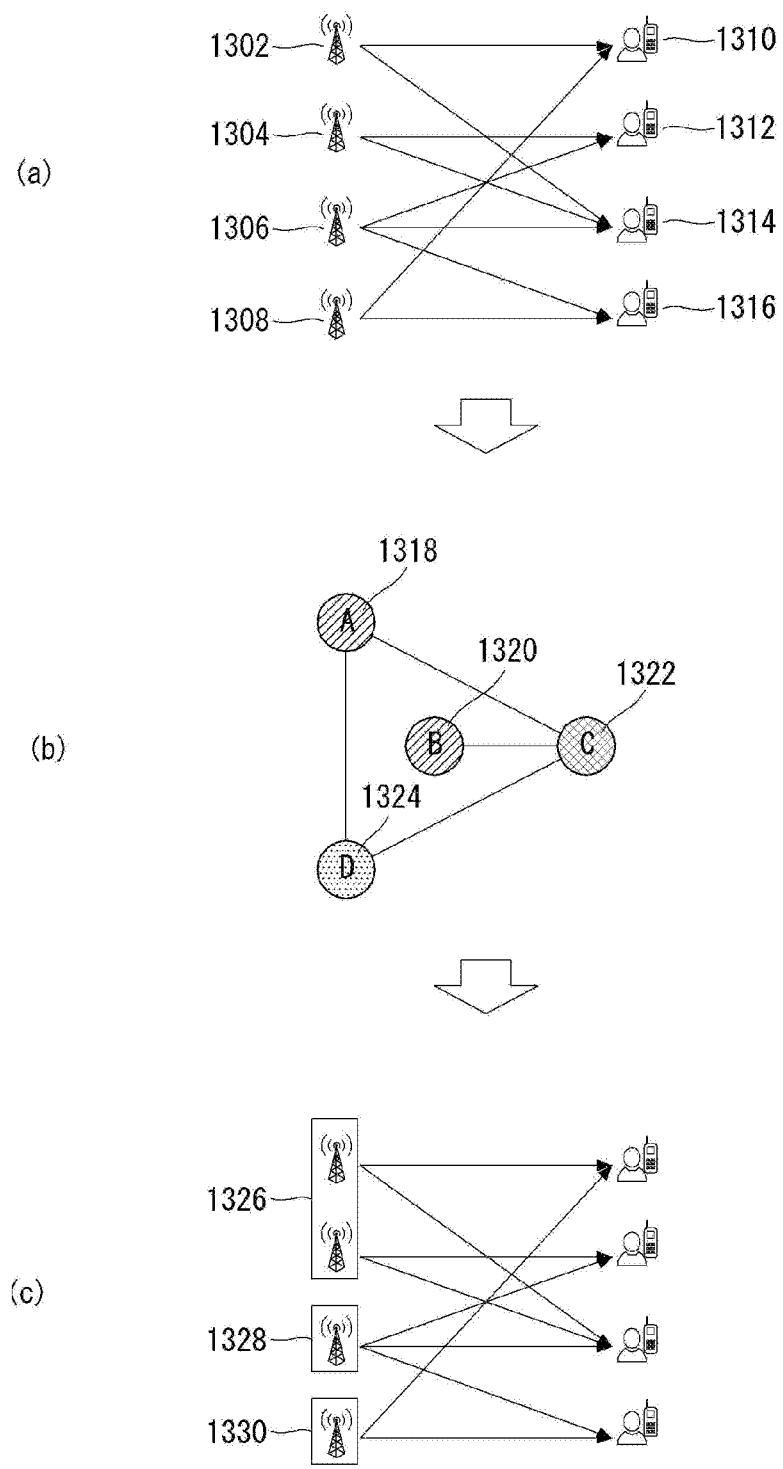

【Figure 14】
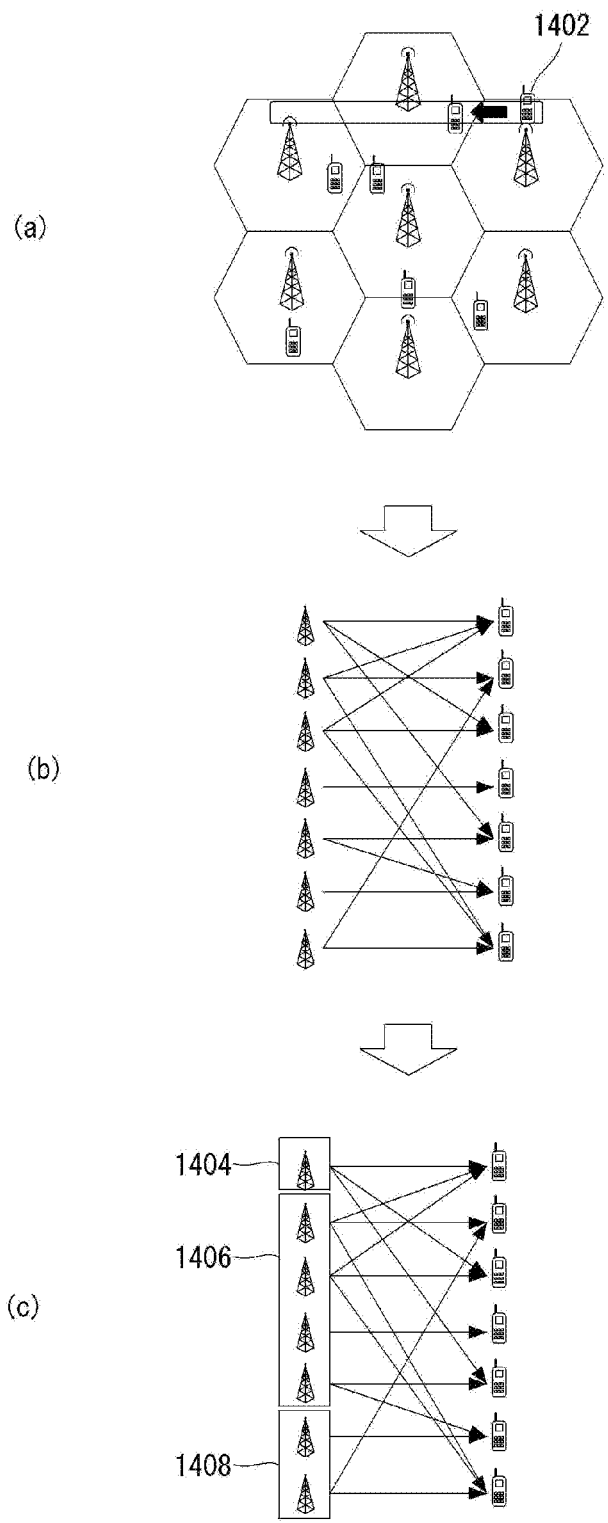

[Figure 15]
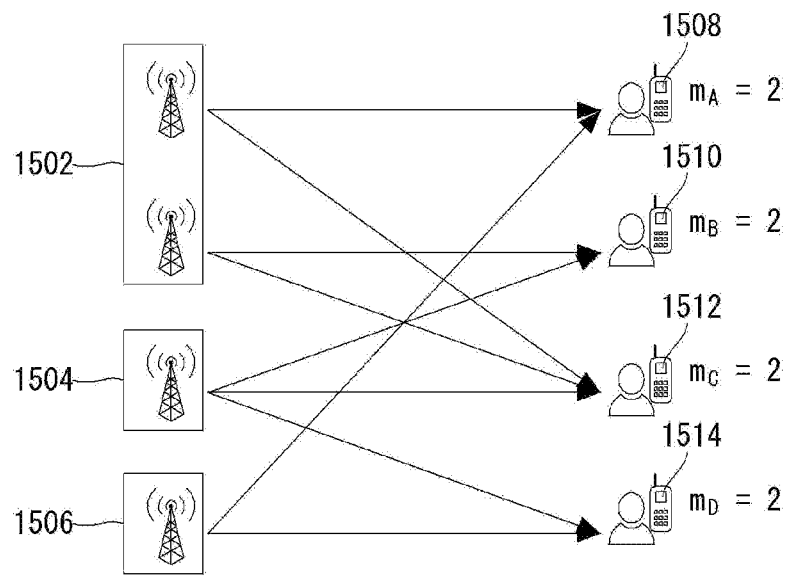
[Figure 16]
$$V = \begin{bmatrix} 1 & \alpha_1 & \alpha_1^2 & \cdots & \alpha_1^{m-1} \\ 1 & \alpha_2 & \alpha_2^2 & \cdots & \alpha_2^{m-1} \\ 1 & \alpha_3 & \alpha_2^2 & \cdots & \alpha_2^{m-1} \\ \cdots & \cdots & \cdots & \vdots & \cdots \\ 1 & \alpha_{X(G)} & \alpha_{X(G)}^2 & \cdots & \alpha_{X(G)}^{m-1} \end{bmatrix}$$
m Time Slot — 1602
X(G) Orthogonal Set — 1604

【Figure 17】
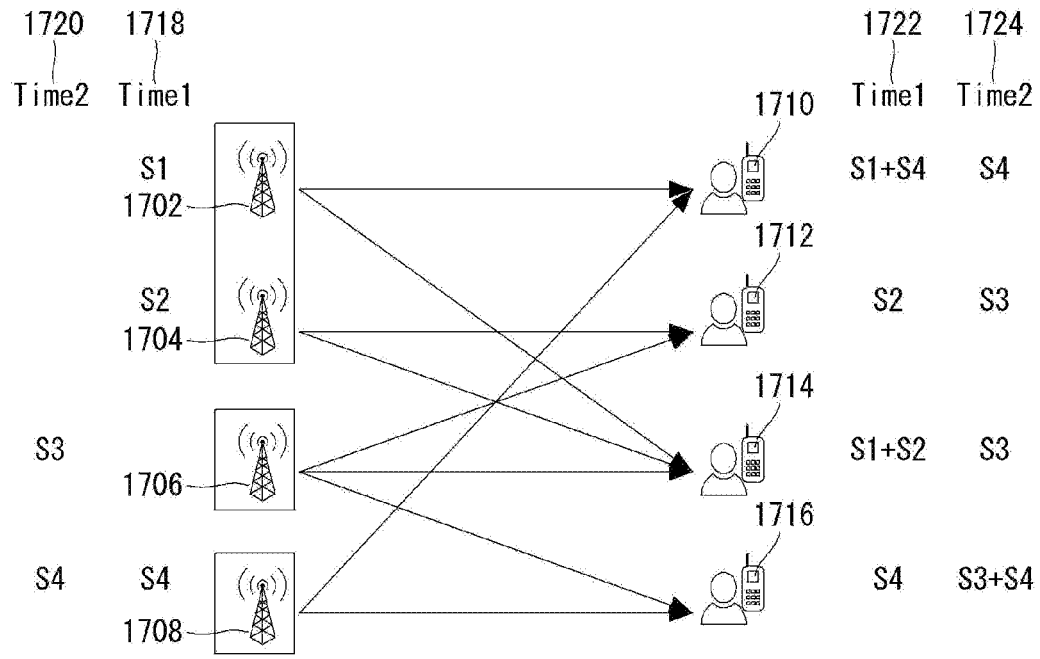
【Figure 18】
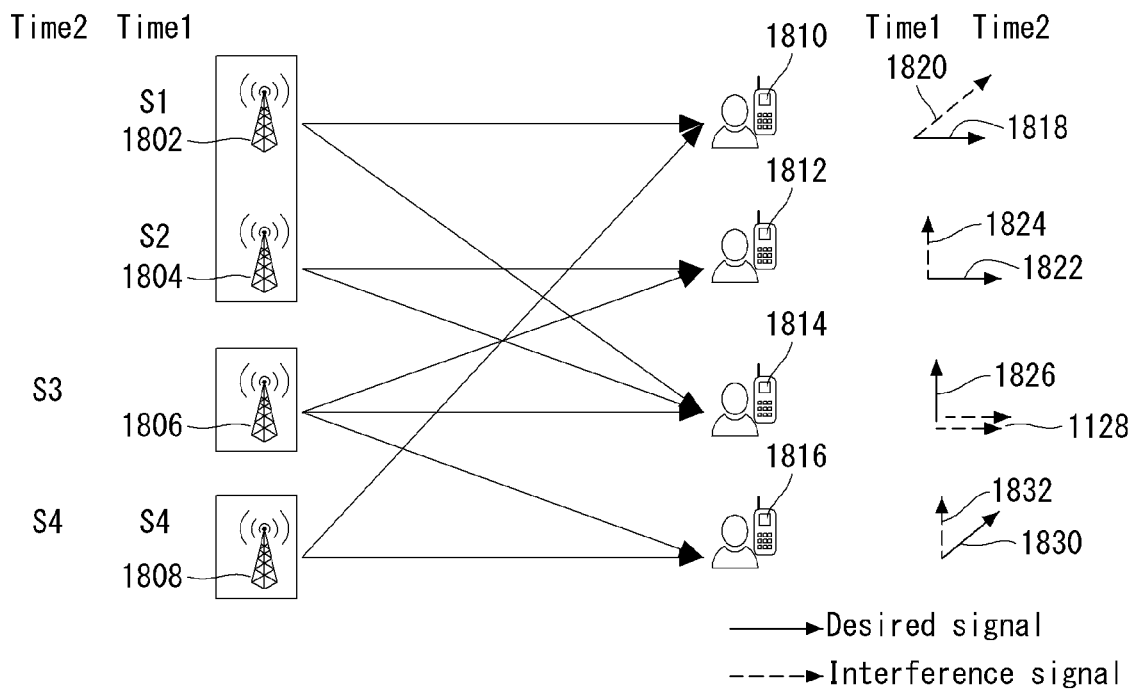

[Figure 19]
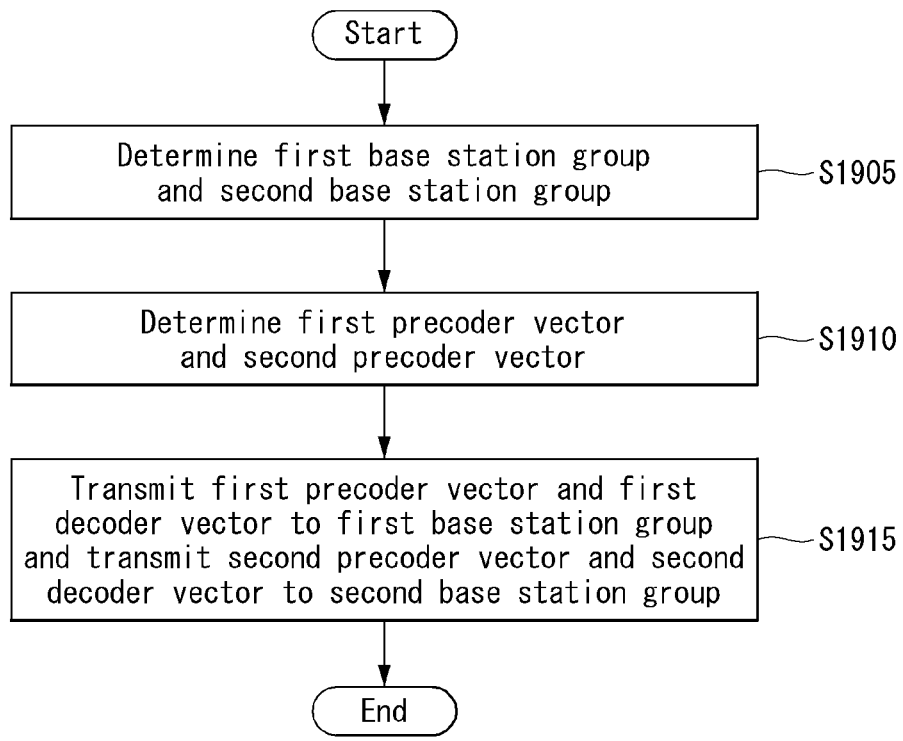
[Figure 20]
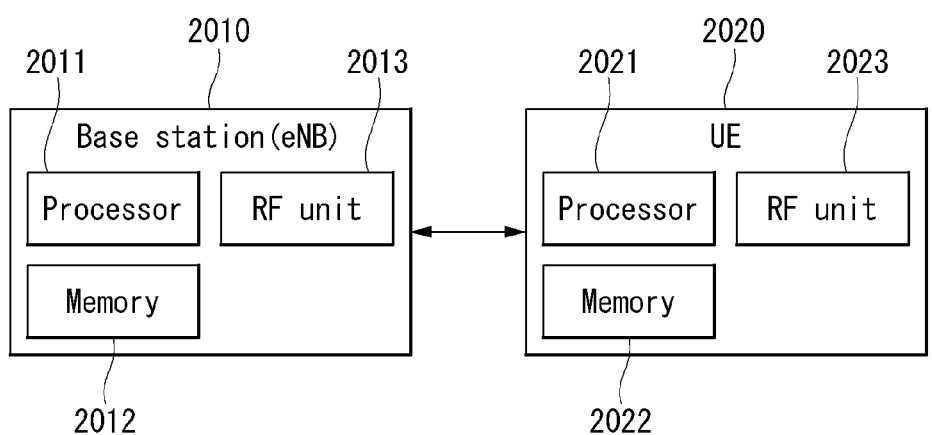

METHOD FOR PERFORMING SCHEDULING IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/000408, filed on Jan. 12, 2017, which claims the benefit of Korean Patent Application No. 10-2016-0172602, filed on Dec. 16, 2016, in the Korean Intellectual Property Office, the contents of which are all hereby incorporated by reference herein in their entirety.

TECHNICAL FIELD

The present invention relates to a wireless communication system, and more particularly to a method for performing scheduling using interference information of a user equipment (UE) and a device supporting the same.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

In a cellular network, when multiple cells perform communication using the same channel, interference between the cells may occur. In this case, when a network topology graph is constructed using only a current location of a user equipment (UE), there occurs a problem that the network topology graph should be updated in a short cycle to process the interference.

To solve the above-described problems of the present invention, the present invention proposes a method for constructing a network topology using mobility information of a UE, etc. as well as a current location of the UE in a wireless communication system.

The present invention also proposes a method for predicting a location of a UE for a specific time using mobility information of the UE.

The present invention also proposes a method for determining a base station causing dominant interference using a predicted location of a UE.

The present invention also proposes a method for constructing a network topology graph for each section of a specific time by combining interference information received from base stations.

The present invention also proposes a method for determining a combined network topology graph used for a specific time using a previously configured threshold value.

The present invention also proposes a method for processing interference between cells using a network topology graph.

The present invention also proposes a method for grouping base stations using a coloring algorithm.

The present invention also proposes a method for assigning a linearly independent vector to each of grouped base stations.

The present invention also proposes a method for determining a precoder vector used in each base station and/or a decoder vector used in each UE.

Technical problems to be solved by the present invention are not limited by the above-mentioned technical problems, and other technical problems which are not mentioned above can be clearly understood from the following description by those skilled in the art to which the present invention pertains.

Technical Solution

A method for processing, by a base station, an interference in a wireless communication system, the method comprising determining a first base station group and a second base station group based on network topology information, determining a first precoder vector for the first base station group and a second precoder vector for the second base station group, the first precoder vector being linearly independent of the second precoder vector, and transmitting the first precoder vector and a first decoder vector to the first base station group and transmitting the second precoder vector and a second decoder vector to the second base station group, wherein the first decoder vector is included in a null space of the second precoder vector, and the second decoder vector is included in a null space of the first precoder vector.

In the present invention, the determining of a first base station and at least one second base station as the first base station group and the second base station group comprises determining the first base station group and the second base station group using a vertex coloring algorithm.

In the present invention, the method further comprises determining a number of base station groups, from which each user equipment (UE) receives at least one of a desired signal or an interference signal, using the configured network topology information, determining a maximum value among the determined numbers of base station groups, and determining a number of time resources used in a signal transmission of the first base station group and the second base station group based on the determined maximum value.

In the present invention, the method further comprises determining a matrix indicating the time resources using the determined number of time resources, and the first precoder vector and the second precoder vector are determined based on the matrix.

In the present invention, the first precoder vector and the second precoder vector each include a row vector constructing the matrix.

In the present invention, the method further comprises receiving interference information about a user equipment (UE) from at least one other base station, wherein the interference information is determined based on a location of the UE predicted based on at least one of location information representing a current location of the UE, mobility information related to a moving path of the UE, velocity information representing a velocity of the UE, or surrounding situation information related to a surrounding environment of the UE, and configuring the network topology information consisting of a sum of respective network topologies determined per each detailed section for a specific time using the received interference information.

In the present invention, the interference information includes information about a base station causing a dominant interference for each detailed section of the specific time, and the dominant interference is determined using the predicted location of the UE for each detailed section and geographical information that is previously stored in at least one second base station.

In the present invention, the configuring of the network topology information comprises determining a network topology to be used for the specific time using the network topology determined per each detailed section and a previously configured threshold value.

In the present invention, the determining of the network topology for each detailed section comprises determining overlapped sections between the interference information received from the at least one other base station, and determining the network topology for each detailed section by configuring respective network topologies for the overlapped sections using interference information about the overlapped sections.

In the present invention, the determining of the network topology to be used for the specific time comprises deciding whether or not a length of each detailed section for the specific time is greater than the previously configured threshold value, and configuring network topology information to be used for the specific time using at least one network topology for at least one detailed section, of which a length is greater than the previously configured threshold value, among the detailed sections according the decision.

A method for performing, by a first base station, a scheduling using interference information of a user equipment (UE) in a wireless communication system, the method comprising receiving, from at least one second base station, interference information about the UE, wherein the interference information is determined based on a location of the UE predicted based on at least one of location information representing a current location of the UE, mobility information related to a moving path of the UE, velocity information representing a velocity of the UE, or surrounding situation information related to a surrounding environment of the UE, configuring network topology information consisting of a sum of respective network topologies determined per each detailed section for a specific time using the received interference information, and transmitting, to the at least one second base station, resource information that is scheduled based on the configured network topology information.

In the present invention, the interference information includes information about a base station causing a dominant interference for each detailed section of the specific time, and the dominant interference is determined using the predicted location of the UE for each detailed section and geographical information that is previously stored in the at least one second base station.

In the present invention, the configuring of the network topology information comprises determining a network topology to be used for the specific time using a network topology determined per each detailed section and a previously configured threshold value.

In the present invention, the determining of the network topology for each detailed section comprises determining overlapped sections between the interference information received from at least one other base station, and determining the network topology for each detailed section by configuring respective network topologies for the overlapped sections using interference information about the overlapped sections.

In the present invention, the determining of the network topology to be used for the specific time comprises deciding whether or not a length of each detailed section for the specific time is greater than the previously configured threshold value, and configuring network topology information to be used for the specific time using at least one network topology for at least one detailed section, of which a length is greater than the previously configured threshold value, among the detailed sections according the decision.

In the present invention, the method further comprises determining the first base station and the at least one second base station as a first base station group and a second base station group based on the configured network topology information, determining a first precoder vector for the first base station group and a second precoder vector for the second base station group, the first precoder vector being linearly independent of the second precoder vector, and transmitting the first precoder vector and a first decoder vector to the first base station group and transmitting the second precoder vector and a second decoder vector to the second base station group, wherein the first decoder vector is included in a null space of the second precoder vector, and the second decoder vector is included in a null space of the first precoder vector.

In the present invention, the determining of the first base station and the at least one second base station as the first base station group and the second base station group comprises determining the first base station group and the second base station group using a vertex coloring algorithm.

In the present invention, the method further comprises determining a number of base station groups connected to each UE using the configured network topology information, determining a maximum value among the determined numbers of base station groups, and determining a number of time resources used in a signal transmission of the first base station group and the second base station group based on the determined maximum value.

In the present invention, the method further comprises determining a matrix indicating the time resources using the determined number of time resources, wherein the first precoder vector and the second precoder vector are determined based on the matrix.

In the present invention, the first precoder vector and the second precoder vector each include a row vector constructing the matrix.

Advantageous Effects

According to embodiments of the present invention, since a network topology is constructed using a predicted location of a UE, interference according to change in a network environment can be efficiently processed even if the network topology is not updated in a short cycle.

According to embodiments of the present invention, interference can be efficiently processed using only network topology information.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, which are included to provide a further understanding of the invention, illustrate embodiments of the invention and together with the description serve to explain the principle of the invention.

FIG. 1 illustrates a structure of a radio frame in a wireless communication system to which the present invention is applicable.

FIG. 2 illustrates a resource grid for one downlink slot in a wireless communication system to which the present invention is applicable.

FIG. 3 illustrates a structure of a downlink subframe in a wireless communication system to which the present invention is applicable.

FIG. 4 illustrates a structure of an uplink subframe in a wireless communication system to which the present invention is applicable.

FIG. 5 illustrates a procedure for constructing a network topology according to an embodiment of the present invention.

FIG. 6 illustrates a procedure for constructing a network topology according to another embodiment of the present invention.

FIG. 7 illustrates a method for predicting a location of a user equipment (UE) for a specific time by a base station of each cell according to an embodiment of the present invention.

FIG. 8 illustrates a method for determining a base station causing dominant interference by a base station of each cell according to an embodiment of the present invention.

FIG. 9 illustrates a method for constructing a network topology graph for each section by a central base station according to an embodiment of the present invention.

FIG. 10 illustrates a method for constructing a combined network topology graph using a threshold value by a central base station according to an embodiment of the present invention.

FIG. 11 illustrates a procedure for constructing a combined network topology graph by a central base station according to an embodiment of the present invention.

FIG. 12 illustrates an operation flow diagram of an interference processing method according to an embodiment of the present invention.

FIG. 13 illustrates a method for grouping base stations according to an embodiment of the present invention.

FIG. 14 illustrates a method for grouping base stations according to another embodiment of the present invention.

FIG. 15 illustrates a method for aligning interferences by a central base station according to an embodiment of the present invention.

FIG. 16 illustrates an example of a time resource indication matrix according to an embodiment of the present invention.

FIG. 17 illustrates an example of expressing interference between cells according to an embodiment of the present invention.

FIG. 18 illustrates another example of expressing interference between cells according to an embodiment of the present invention.

FIG. 19 illustrates an operation flow diagram of a base station for processing interference according to an embodiment of the present invention.

FIG. 20 illustrates a block configuration diagram of a wireless communication device according to an embodiment of the present invention.

MODE FOR INVENTION

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as a user equipment (UE), a mobile station (MS), a user terminal (UT), a mobile subscriber station (MSS), a subscriber station (SS), an dvanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

FIG. 1 illustrates a structure of a radio frame in a wireless communication system to which the present invention is applicable.

3GPP LTE/LTE-A supports radio frame structure type 1 applicable to frequency division duplex (FDD) and radio frame structure Type 2 applicable to time division duplex (TDD).

In FIG. 1, the size of a radio frame in a time domain is represented as a multiple of a time unit of $T\_s=1/(15000*2048)$. Downlink and uplink transmissions consist of a radio frame having a duration of $T\_f=307200*T\_s=10$ ms.

FIG. 1(a) illustrates the radio frame structure type 1. The radio frame structure type 1 is applicable to both full duplex FDD and half duplex FDD.

A radio frame consists of 10 subframes. One radio frame consists of 20 slots of $T\_slot=15360*T\_s=0.5$ ms length, and indexes of 0 to 19 are given to the respective slots. One subframe consists of two consecutive slots in the time domain, and subframe i consists of slot 2i and slot 2i+1. A time required to transmit one subframe is referred to as a transmission time interval (TTI). For example, the length of one subframe may be 1 ms, and the length of one slot may be 0.5 ms.

The uplink transmission and the downlink transmission in the FDD are distinguished in the frequency domain. Whereas there is no restriction in the full duplex FDD, a UE cannot transmit and receive simultaneously in the half duplex FDD operation.

One slot includes a plurality of orthogonal frequency division multiplexing (OFDM) symbols in the time domain and includes a plurality of resource blocks (RBs) in a frequency domain. Since 3GPP LTE uses OFDMA in downlink, OFDM symbols are used to represent one symbol period. The OFDM symbol may be called one SC-FDMA symbol or a symbol period. The resource block is a resource allocation unit and includes a plurality of consecutive subcarriers in one slot.

FIG. 1(b) illustrates frame structure type 2.

The radio frame type 2 consists of two half-frames of length $153600*T\_s=5$ ms each. Each half-frame consists of five subframes of length $30720*T\_s=1$ ms.

In the frame structure type 2 of a TDD system, uplink-downlink configuration is a rule indicating whether uplink and downlink are allocated (or reserved) to all subframes.

Table 1 represents uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for downlink transmission, 'U' represents a subframe for uplink transmission, and 'S' represents a special subframe consisting of three types of fields including a downlink pilot time slot (DwPTS), a guard period (GP), and a uplink pilot time slot (UpPTS).

The DwPTS is used for an initial cell search, synchronization or channel estimation in a UE. The UpPTS is used for channel estimation in a base station and for synchronizing uplink transmission synchronization of the UE. The GP is duration for removing interference generated in uplink due to multi-path delay of a downlink signal between uplink and downlink.

Each subframe i consists of slot 2i and slot 2i+1 of $T\_slot=15360*T\_s=0.5$ ms length each.

The uplink-downlink configuration may be classified into 7 types, and a location and/or the number of a downlink subframe, a special subframe and an uplink subframe are different for each configuration.

A point of time at which a switch from downlink to uplink or from uplink to downlink is performed is referred to as a switching point. A switch-point periodicity refers to a period in which switched patterns of an uplink subframe and a downlink subframe are equally repeated, and both 5 ms and 10 ms switch-point periodicity are supported. In case of 5 ms downlink-to-uplink switch-point periodicity, the special subframe S exists in every half-frame. In case of 5 ms downlink-to-uplink switch-point periodicity, the special subframe S exists in a first half-frame only.

In all the configurations, subframes 0 and 5 and a DwPTS are reserved for downlink transmission only. An UpPTS and a subframe immediately following the special subframe are always reserved for uplink transmission.

Such uplink-downlink configurations may be known to both the base station and the UE as system information. The base station may inform the UE of change in an uplink-downlink allocation state of a radio frame by transmitting only indexes of uplink-downlink configuration information to the UE each time the uplink-downlink configuration information is changed. Furthermore, configuration information is a kind of downlink control information and may be transmitted via a physical downlink control channel (PDCCH) like other scheduling information, or is a kind of broadcast information and may be commonly transmitted to all UEs within a cell via a broadcast channel.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of a radio subframe according to an example of FIG. 1 is merely an example, and the number of subcarriers included in a radio frame, the number of slots included in a subframe, and the number of OFDM symbols included in a slot may be variously changed.

FIG. 2 illustrates a resource grid for one downlink slot in a wireless communication system to which the present invention is applicable.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in a wireless communication system to which the present invention is applicable.

Referring to FIG. 3, a maximum of three fore OFDM symbols in the first slot of the subframe is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

An enhanced PDCCH (EPDCCH) carries UE-specific signaling. The EPDCCH is located in a physical resource block (PRB) that is configured to be UE specific. In other words, as described above, the PDCCH may be transmitted in up to first three OFDM symbols in a first slot of a subframe, but the EPDCCH may be transmitted in a resource region other than the PDCCH. A time (i.e., symbol) at which the EPDCCH starts in the subframe may be configured to the UE via higher layer signaling (e.g., RRC signaling, etc.).

The EPDCCH may carry a transport format, resource allocation and HARQ information related to DL-SCH, a transport format, resource allocation and HARQ information related to UL-SCH, resource allocation information related to sidelink shared channel (SL-SCH) and physical sidelink control channel (PSCCH), etc. Multiple EPDCCHs may be supported, and the UE may monitor a set of EPCCHs.

The EPDCCH may be transmitted using one or more consecutive enhanced CCEs (ECCEs), and the number of ECCEs per EPDCCH may be determined for each EPDCCH format.

Each ECCE may consist of a plurality of enhanced resource element groups (EREGs). The EREG is used to define mapping of the ECCE to the RE. There are 16 EREGs per PRB pair. All REs except the RE carrying the DMRS in each PRB pair are numbered from 0 to 15 in increasing order of the frequency and then in increasing order of time.

The UE may monitor a plurality of EPDCCHs. For example, one or two EPDCCH sets may be configured in one PRB pair in which the UE monitors EPDCCH transmission.

Different coding rates may be implemented for the EPCCH by combining different numbers of ECCEs. The EPCCH may use localized transmission or distributed transmission, and hence, the mapping of ECCE to the RE in the PRB may vary.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

In a cellular network such as LTE(-A) or 5G wireless communication system, in case of performing communication (or transmitting signal) using the same channel between respective cells, interference between cells may occur.

For example, when a first cell and a second cell transmit a signal using the same channel, a signal of the first cell acts as interference to a base station of the second cell. Thus, various algorithms have been developed to efficiently process (ore remove) the interference between cells.

For example, there may be interference processing algorithms using an interference environment state graph of a network (network topology graph).

The interference environment state graph of the cellular network may be a graph representing a path of signal exchange between the UE and the base station.

More specifically, the interference environment state graph may be a graph representing which base station or cell causes dominant interference affecting a UE of each cell.

For example, when a base station transmits a signal to a first UE and a second UE, the interference environment state graph may be constructed using an arrow from the base station to the first and second UEs.

The interference environment state graph of the cellular network may be called 'network topology graph' or 'network topology information' or the like, and is hereinafter collectively referred to as 'network topology graph' for convenience of explanation.

In case of an interference processing algorithm using the above-described network topology graph, a base station constructs a current network topology using location information of a UE of each cell and processes the interference using it.

In this instance, when there is a change in an interference environment between the base station and/or the UEs, the base station needs to update the network topology graph in a short cycle. Further, the base station needs to configure new scheduling to the UE according to the updated network topology.

In another method, the base station may construct the network topology graph using movement (or mobility) and traffic information (e.g., when a UE moves through a vehicle) of a UE as well as location information of the UE.

The traffic information may be expressed by surrounding situation information or surrounding environment information of the UE.

In this case, the base station may consider interference environments that may occur for a specific time. Hence, the base station may construct an adaptive network topology graph.

As a result, the base station can efficiently (or robustly) process the interference between cells using the adaptive network topology graph even if there is a change in an interference environment of the network.

As described above, the base station needs to construct the network topology graph, in order to process interference between cells using the same channel. In this case, the network topology graph may be constructed by a central base station for managing or controlling a plurality of base stations or a separate device (e.g., central server, transmitter and receiver unit (TXRU)).

Accordingly, in the following is described a method and a device for scheduling radio resources by constructing the network topology graph used for the interference processing.

Method for Constructing Network Topology for Processing Interference Between Cells FIG. 5 illustrates a procedure for constructing a network topology according to an embodiment of the present invention. FIG. 5 is merely for convenience of explanation and does not limit the scope of the present invention.

Referring to FIG. 5, it is assumed that a central base station receives information from base stations of respective cells and constructs a network topology graph.

In step S505, the base station of each cell may obtain location information of a UE supported in the cell.

In this case, the base station of each cell may receive (in an explicit manner) the location information (e.g., GPS information, etc.) from the UE, or predict (in an implicit manner) a location of the UE based on beamforming information of the base station and/or the UE.

After the base station of each cell identifies the location of the UE, in step S510, the base station may identify a base station causing dominant interference and/or a base station causing a noise according to the location of the UE in the cell.

In this case, the base station may combine information about the identified base stations and generate interference information applied to the UE Afterwards, in step S515, the base stations of respective cells may transmit the generated interference information to the central base station. Here, the central base station may be one of a plurality of base stations, a central server, or a separate device managing (or controlling) the base stations.

After the central base station receives the interference information, in step S520, the central base station may construct a network topology graph using the received interference information.

For example, the central base station may combine a first network topology graph derived from interference information received from a first base station and a second network topology graph derived from interference information received from a second base station to construct a combined network topology graph.

When the network topology graph is constructed, the central base station may command the base stations of the respective cells to perform again the step S505 after a predetermined time passed, in order to update the network topology graph. In this instance, the central base station may send a message to the command to other base stations using X2 interface.

Hence, the network topology graph constructed by the central base station may be periodically updated. In this case, in view of the fact that the network topology graph is constructed using only location information of the UE, the update cycle may be short. In other words, the steps S505 to S520 may be repeatedly performed in a short cycle.

After the central base station constructs the network topology graph, in step S525, the central base station may process interference between the cells using the constructed network topology graph.

For example, the central base station may group the base stations of the respective cells and assign precoder vectors and decoder vectors to each group. In this instance, the precoder vectors assigned to each group may have a linearly independent relation between them.

Processing the interference between cells using the network topology graph described above is described in detail below with reference to FIGS. 12 to 19.

When the network topology is constructed, the central base station may transmit network topology information consisting of the base stations of the respective cells. In this case, the central base station may use a connection interface between base stations, such as Xn interface (e.g., X2 interface), to transmit the network topology information.

In FIG. 5 above, the central base station constructs the network topology using interference information determined using only current location information of the UE received from the base stations of the respective cells.

However, the central base station may construct the network topology through interference information determined using mobility information of the UE as well as the current location information of the UE.

FIG. 6 illustrates a procedure for constructing a network topology according to another embodiment of the present invention. FIG. 6 is merely for convenience of explanation and does not limit the scope of the present invention.

Referring to FIG. 6, it is assumed that a central base station receives information from base stations of respective cells and constructs a network topology graph. Further, in FIG. 6, it may be assumed that a base station and a UE are included in a network system (e.g., vehicle-to-everything (V2X) network system, etc.) in which geographical information (e.g., road information, terrain information, building location information, etc.) has been previously determined.

The central base station may be implemented as one of multiple base stations or a separate device other than the base stations.

Further, 'the base station of the cell' described in the present disclosure may be briefly expressed as 'cell' or 'base station' and may be interpreted in the same sense.

In step S605, the base station of each cell may obtain location information of the UE and mobility information of the UE supported in the cell.

In addition, the base station of each cell may obtain velocity information representing a velocity of the UE, surrounding situation information related to a surrounding environment of the UE, and the like.

The surrounding situation information may include traffic information representing a traffic situation around the UE.

In this case, the base station of each cell may receive (in an explicit manner) the location information (e.g., GPS information, etc.) from the UE, or predict (in an implicit manner) a location of the UE based on beamforming information of the base station and/or the UE.

For example, the base station of each cell may receive, from the UE, information about a current coordinate value of the UE, a velocity of the UE, and the like.

After the base station of each cell obtains at least one of the location information, the mobility information, the velocity information, and the surrounding situation information of the UE, the base station of each cell may predict locations of one or more UEs for a specific time Δt in step S610.

For example, the base station may divide a location of the UE for 10 seconds into four sections and predict locations of the UEs. More specifically, the base station may predict a location of a UE after 3 seconds, a location of a UE after 5 seconds, a location of a UE after 6 seconds, and a location of a UE after 9 seconds from a reference time point.

The detailed content that the base station of each cell predicts a location of the UE for a specific time will be described later with reference to FIG. 7.

Further, the base station of each cell may determine a base station causing dominant interference per each predicted location of the UE. Here, the dominant interference may mean a case in which there is a base station of another cell that has a predetermined level of influence on the corresponding UE.

In this case, the predetermined level may be determined by received signal quality (e.g., reference signal received power (RSRP), received signal strength indicator (RSSI), reference signal received quality (RSRQ), etc.).

In this case, the base station of each cell may determine a base station causing dominant interference to the UE using information of a previously stored interference region. Hence, the base station of each cell may generate interference information on the UE per each section of a specific time.

The detailed content that the base station of each cell determines a base station causing the dominant interference to the UE in each section for a specific time will be described later with reference to FIG. 8.

Afterwards, in step S615, the base stations of respective cells may transmit the generated interference information to the central base station. Here, the central base station may be one of a plurality of base stations, a central server, or a separate device capable of managing (or controlling) the base stations.

The central base station may be represented as a first base station, and the base station of each cell may be represented as a second base station.

Afterwards, in step S620, the central base station may construct a network topology graph for each section (or detailed section) of a specific time using the received interference information. In this case, one or more network topology graphs may be constructed for a specific time. Here, the central base station may differently construct the network topology graph for each section in which there is a change in configuration of the base station causing the interference information.

The detailed content that the central base station constructs the network topology graph for each section for a specific time using the interference information received from the base stations will be described later with reference to FIG. 9.

After the central base station constructs the network topology graph for each section of a specific time, in step S625, the central base station may construct a combined (or used for a specific time) network topology graph according to a previously configured (or defined) threshold value.

In this case, the central base station may apply the previously configured threshold value to each section for a specific time. Hence, a network topology of a selected section may be used to construct the combined network topology graph.

The threshold value may be configured by a service provider, a network manager, a service user, and the like.

The detailed content that the central base station constructs the combined network topology graph using the previously configured threshold value and the network topology graphs of the sections for a specific time will be described later with reference to FIG. 10.

After the combined network topology graph is constructed, the central base station may command the base stations of the respective cells to perform again the step S505 after a predetermined time passed, in order to update the network topology graph. In this instance, the central base station may send a message to the command to other base stations using X2 interface.

Hence, the network topology graph constructed by the central base station may be periodically updated. In this case, the network topology graph may be updated every specific time Δt for which the base station of each cell predicts a location of the UE.

The specific time that is an update cycle in FIG. 6 may be longer than the update cycle described in FIG. 5. This is because the central base station in case of FIG. 6 constructs the network topology graph using interference information predicted based on location information and mobility information of the UE.

Hence, even if the network topology graph is not updated in a short cycle, the present invention can process efficiently interference between the cells generated when a network interference environment is changed.

After the central base station constructs the network topology graph, in step S630, the central base station can process efficiently interference between the cells using the constructed network topology graph. Here, a procedure for processing the interference may be similar to the procedure described in the step S525 of FIG. 5.

For example, the central base station may group the base stations of the respective cells and assign precoder vectors and decoder vectors to each group. In this instance, the precoder vectors assigned to each group may have a linearly independent relation and may be vectors indicating a time resource used by each base station.

The content that the interference between the cells is processed using the network topology graph as described above will be described in detail later with reference to FIGS. 12 to 19.

If the network topology is constructed, the central base station may transmit constructed (or configured) network topology information to the base stations of the respective cells. In this case, the central base station may use a connection interface between the base stations, such as X2 interface, to transmit the network topology information.

The network topology information may mean a network topology (graph) consisting of a sum of respective network topology (graphs) determined per each (detailed) section of a specific time.

The procedure illustrated in FIG. 6 is different form the procedure illustrated in FIG. 5 in that a) the base station of each cell considers both location information and mobility information of the UE, b) the base station of each cell determines a base station causing dominant interference for each section of a specific time Δt, c) the central base station constructs a network topology graph for each section using interference information received from base stations, and d) the central base station constructs a combined network topology graph using a network topology graph selected according to a previously configured threshold value.

Among the above differences, the detailed content related to the difference that a) the base station of each cell considers both location information and mobility information of the UE is described below.

FIG. 7 illustrates a method for predicting a location of a UE for a specific time by a base station of each cell according to an embodiment of the present invention. FIG. 7 is merely for convenience of explanation and does not limit the scope of the present invention.

Referring to FIG. 7, it is assumed that a UE 705 moves inside a cell supported by a base station 710.

The base station 710 may predict a location of the UE 705 for a specific time Δt using a location, a movement, and a velocity of the UE 705 that exists in the cell, and/or traffic information.

As shown in FIG. 7, the specific time Δt may include a section 702 denoted as '$t_{A1}$', a section 704 denoted as '$t_{A2}$', a section 706 denoted as '$t_{A3}$', and a section 708 denoted as '$t_{A4}$'.

For example, if the UE 705 moves on a highway, the base station 710 may predict locations of the UE 705 at the section 702, the section 704, the section 706, and the section 708 using information about a road and a velocity at which the UE is currently located.

In another example, if there are many alleys in the civic center (center of town), the base station 710 may predict locations of the UE 705 at the section 702, the section 704, the section 706, and the section 708 using a distribution (e.g., normal distribution, Gaussian distribution, etc.) generated using information about vehicles that the UE has passed before.

If the base station predicts the locations of the UE using the distribution, the base station may use a random walk scheme.

Among the above differences, the detailed content related to the difference that b) the base station of each cell determines a base station causing dominant interference for each section of a specific time Δt is described below.

FIG. 8 illustrates a method for determining a base station causing dominant interference by a base station of each cell according to an embodiment of the present invention. FIG.

8 is merely for convenience of explanation and does not limit the scope of the present invention.

Referring to FIG. 8, a cell area supported by a base station 810 may be classified into an area (a non-interference area) 802 in which there is no influence of interference (that is not subject to dominant interference), an area (1-interference area) 804 that is subject to dominant interference from one base station, and an area (2-interference area) 806 that is subject to dominant interference from two base stations.

In FIG. 8, assuming that a shape of a cell is a hexagonal structure, an area related to interference is classified into three kinds. However, in various embodiments, as the shape of the cell is variously changed, the area related to interference may be classified variously (or into various numbers or various kinds).

The areas 802, 804, and 806 may refer to areas that are previously defined according to reception quality. In other words, geographical information about the areas 802, 804, and 806 may be previously shared between the base station and the UE.

Hence, a base station of each cell may determine a base station causing dominant interference to a UE using a predicted location of the UE and the geographical information.

As illustrated in (a) of FIG. 8, a UE 805 may be located in the area 802. The UE 805 located in the area 802 may receive a signal from the base station 810 without interference. In this case, the base station 810 may determine that there is no base station causing dominant interference to the UE 805 using a predicted location of the UE 805 and geographical information.

As illustrated in (b) of FIG. 8, the UE 805 may be located in the area 804. Here, areas represented in a form similar to the area 804 illustrated in (b) of FIG. 8 may mean areas in which the UE is subject to dominant interference from one base station.

A base station 820 may cause dominant interference to the UE 805 located in the area 804. In this case, the base station 810 may determine the base station 820 as a base station causing dominant interference to the UE 805 using a predicted location of the UE 805 and geographical information.

As illustrated in (c) of FIG. 8, the UE 805 may be located in the area 806. Here, areas represented in a form similar to the area 806 illustrated in (c) of FIG. 8 may mean areas in which the UE is subject to dominant interference from two base stations.

Base stations 820 and 830 may cause dominant interference to the UE 805 located in the area 806. In this case, the base station 810 may determine the base stations 820 and 830 as a base station causing dominant interference to the UE 805 using a predicted location of the UE 805 and geographical information.

If the base station of each cell predicts a location of the UE in each section, the base stations of each cell may decide whether the predicted location of the UE in each section corresponds to (a) of FIG. 8, (b) of FIG. 8, or (c) of FIG. 8. As a result, the base stations of each cell may determine (check) a base station causing dominant interference to the UE for a specific time.

Afterwards, the base stations of each cell may transmit to the central base station interference information (or information about a base station causing dominant interference to the UE) determined according to the above method.

Among the above differences, the detailed content related to the difference that c) the central base station constructs a network topology graph for each section using interference information received from base stations is described below.

FIG. 9 illustrates a method for constructing a network topology graph for each section by a central base station according to an embodiment of the present invention. FIG. 9 is merely for convenience of explanation and does not limit the scope of the present invention.

Referring to FIG. 9, it is assumed that base station of each cell transmits to a central base station interference information configured for a specific time Δt as illustrated in (a) of FIG. 9.

(b) of FIG. 9 illustrates interference information received from the base station of each cell illustrated in (a) of FIG. 9. For example, (b) of FIG. 9 illustrates interference information received from a cell 902 (or cell A), interference information received from a cell 904 (or cell B), and interference information received from a cell 906 (or cell C).

Here, each interference information may mean interference information about each UE supported by each cell. In other words, the interference information received from the cell 902 may mean interference information about a UE supported by a base station of the cell 902, the interference information received from the cell 904 may mean interference information about a UE supported by a base station of the cell 904, and the interference information received from the cell 906 may mean interference information about a UE supported by a base station of the cell 906.

The central base station may receive interference information from base stations of respective cells and then combine the received information to construct a network topology graph for each section of a specific time.

In other words, as illustrated in (c) of FIG. 9, the central base station may construct a network topology graph 912 (or $G_1$), a network topology graph 914 (or $G_2$), . . . , and a network topology graph 916 (or $G_n$) for a section 925 (or $t_1$), a section 930 (or $t_2$), . . . , and a section 935 (or $t_n$), respectively.

In (c) of FIG. 9, $t_1$, $t_2$, . . . , and $t_n$ each may denote a section in which configuration of a base station causing dominant interference to the UEs is changed. In other words, each section may be divided according to the configuration of the base station causing dominant interference to the UEs.

More specifically, referring to (b) and (c) of FIG. 9, the section 925 may denote an overlap section of a section 905 (or $tA_1$) of the cell 902, a section 910 (or $t_{B1}$) of the cell 904, and a section 915 (or $t_{G1}$) of the cell 906.

Hence, the central base station may construct the network topology graph 912 using interference information (or information about a base station causing dominant interference to the UE) in the section 905 of the cell 902, interference information in the section 910 of the cell 904, and interference information in the section 915 of the cell 906.

Further, the section 930 may denote an overlap section of the section 905 (or $t_{A1}$) of the cell 902, a section 920 (or $t_{B2}$) of the cell 904, and the section 915 (or $t_{G1}$) of the cell 906.

Hence, the central base station may construct the network topology graph 914 using interference information in the section 905 of the cell 902, interference information in the section 920 of the cell 904, and interference information in the section 915 of the cell 906.

In addition, the central base station may construct the network topology graph 916 for the section 935 by equally applying the method described above.

Thus, the central base station can construct the network topology graphs for the respective sections included in the specific time according to the above-described method.

Among the above differences, the detailed content related to the difference d) the central base station constructs a combined network topology graph using a network topology graph selected according to a previously configured threshold value is described below.

FIG. 10 illustrates a method for constructing a combined network topology graph using a threshold value by a central base station according to an embodiment of the present invention. FIG. 10 is merely for convenience of explanation and does not limit the scope of the present invention.

Referring to FIG. 10, it is assumed that a central base station constructs a network topology graph 1002 (or $G_1$) for a section 1005 (or $t_1$), a network topology graph 1004 (or $G_2$) for a section 1010 (or $t_2$), and a network topology graph 1002 (or $G_n$) for a section 1015 (or $t_n$).

The central base station may use a previously configured threshold value to construct a combined network topology graph 1008. In this case, the central base station may not use a network topology graph of a section that does not satisfy conditions of the previously configured threshold value.

In FIG. 10, the previously configured threshold value may be a value representing a length of a time section. For example, the central base station may not use the network topology graph 1004 for the section 1010 that is determined as a section of which a length is shorter than the configured threshold value.

More specifically, the central base station may use a threshold value, which is set to 2 seconds, to determine the combined network topology graph. In this case, the central base station does not use a network topology graph for a section (e.g., the section 1010), of which a length is equal to or less than 2 seconds, when constructing a combined network topology.

Thus, an interference processing degree may be changed by controlling the threshold value. If the threshold value is configured to be small, the central base station can process (or remove) more accurately interference because network topologies of many sections are considered. However, in this case, since a large number of interference situations are considered, overhead of the central base station may occur (or a processing performance of the central base station may be reduced).

On the other hand, if the threshold value is configured to be large, the central base station can process (or remove) more incompletely interference because network topologies of less sections are considered. However, in this case, since a small number of interference situations are considered, a processing performance (speed) of the central base station may be improved.

That is, the threshold value used to construct the combined network topology may be configured depending on a required interference processing degree.

Further, the threshold value may be configured depending on a current location of the UE, predicted geographical information (e.g., terrain features to be passed), a network connection state of the UE, or the like. For example, when the network topology changes very frequently due to a change in the location of the UE, it may be reasonable to consider network topologies of all sections by configuring the threshold value to be very small.

Further, a method for configuring the threshold value may be fixed to specific conditions. For example, the threshold value may be configured to $1/10$ of a longest section among sections of a specific time.

FIG. 11 illustrates a procedure for constructing a combined network topology graph by a central base station according to an embodiment of the present invention. FIG. 11 is merely for convenience of explanation and does not limit the scope of the present invention.

Referring to FIG. 11, it is assumed that a central base station (or a base station) controls at least one other base station.

The central base station may be represented as a first base station, and the at least one other base station may be represented as at least one second base station.

In step S1105, the central base station may receive interference information about a UE from the at least one other base station.

In this case, the interference information may include interference information about each UE that at least one other base station supports.

The interference information may be determined according to a location of the UE predicted based on at least one of location information representing a current location of the UE, mobility information related to a movement or a moving path of the UE, velocity information representing a velocity of the UE, or surrounding situation information (e.g., traffic situation information) related to a surrounding environment of the UE.

Further, the interference information may include information about a base station causing dominant interference for each (detailed) section for a specific time. A method for determining the information about the base station causing the dominant interference is similar to the method described in FIG. 8.

The dominant interference may be determined using a predicted location of the UE for each section and geographical information that is previously stored in at least one other base station. The previously stored geographical information may be shared by the base station and the UE.

After the central base station receives the interference information, the central base station may determine a network topology graph using the received interference information in step S1110.

The network topology graph determined using the received interference information may mean network topology information defined above.

That is, the network topology information means a network topology (graph) consisting of a sum of respective network topologies determined per each detailed section for the specific time.

In this case, the central base station may determine the network topology graph using the method described in FIGS. 9 and 10.

Thus, the central base station may determine a network topology graph for each section for the specific time and may determine a network topology graph used for the specific time using the determined network topology graph and a previously configured threshold value.

In this case, as illustrated in FIG. 9, when sections constructing interference information for respective cells overlap each other, the central base station may construct a network topology graph of the corresponding section considering the network topology graphs of overlapped sections.

A length of each of the overlapped sections may be determined depending on whether there is a change in a base station causing dominant interference to the UEs that the central base station and at least one other base station support.

Further, as illustrated in FIG. 10, a previously configured threshold value may be used to construct a network topology graph to be used for a specific time. Hence, an efficiency aspect of interference processing by the central base station may be considered.

After the central base station determines the network topology graph, the central base station may transmit information about the determined network topology graph to at least one other base station in step S1115.

Hence, the central base station can process interference between base stations, and each base station can efficiently (or while an influence of interference is not large) communicate with the UE.

Method for Processing Interference Between Cells Using Configured Network Topology Various algorithms has been developed and/or studied to process interference between cells. However, many conditions (or assumptions) need to be considered to apply existing developed algorithms to an actual communication system.

Thus, the existing developed algorithms have been unsuitable for the actual communication system.

Hence, the present invention proposes an efficient interference processing algorithm that can be immediately applied to a cellular network communication system.

More specifically, in various embodiments of the present invention, when a network topology is constructed in a central base station as described above, the central base station can process interference between cells using the constructed network topology.

FIG. 12 illustrates an operation flow diagram of an interference processing method according to an embodiment of the present invention. FIG. 11 is merely for convenience of explanation and does not limit the scope of the present invention.

Referring to FIG. 12, an interference processing method proposed by the present invention may include a step 1204 of grouping base stations in an orthogonal set and a step 1206 of applying an algorithm for aligning interference.

For convenience of explanation, a subject performing an operation illustrated in FIG. 12 may be called a central base station managing base stations.

However, the subject of the operation illustrated in FIG. 12 is not limited to the central base station.

For example, a central base station managing (or controlling) base stations supporting UEs, one of a plurality of base stations, or a separate control device (e.g., central server, etc.) managing the base stations and/or the UEs may perform operations for the interference processing illustrated in FIG. 12.

As described above, the central base station may use a network topology graph 1202 to process interference between cells.

Here, the network topology graph 1202 may be a graph representing a network topology constructed using current UE information. For example, the network topology graph 1202 may include information about a network topology constructed using a procedure illustrated in FIG. 5.

Alternatively, the network topology graph 1202 may be a graph representing a network topology constructed using current UE information, mobility information of the UE, or surrounding traffic information of the UE, etc. For example, the network topology graph 1202 may include information about a network topology constructed using a procedure illustrated in FIG. 6.

The central base station may group the base stations using the network topology graph 1202 and a graph coloring algorithm (in step S1204).

The central base station may group base stations, which do not cause interference between them, using the graph coloring algorithm.

An operation for grouping the base stations to process the interference will be described in detail later with reference to FIGS. 13 and 14.

After the base stations are grouped, the central base station may confirm (or check) whether to align interference between cells using the same channel.

A procedure for aligning interference may refer to a procedure for representing signals received by the UE in a vector form to check whether vectors of the signals are independent of each other.

In this case, the central base station may distinguish a desired signal and an interference signal for the base stations and/or the UEs and determine a precoder and decoder matrix 1208.

A precoder matrix consists of at least one precoder vector used in each base station, and a decoder matrix consists of at least one decoder vector supported by each base station.

The content that the central base station aligns the interference and determines the precoder matrix used in each base station and the decoder matrix (or vector) used in each UE will be described in detail later with reference to FIGS. 15 to 18.

FIG. 13 illustrates a method for grouping base stations according to an embodiment of the present invention. FIG. 13 is merely for convenience of explanation and does not limit the scope of the present invention.

Referring to FIG. 13, it is assumed that four cells are present in a wireless communication system and each cell includes a base station and a UE. That is, it is assumed that four base stations and four UEs are present in the wireless communication system.

(a) of FIG. 13 illustrates a network topology graph representing a relation between base stations and UEs.

Here, a base station 1302 supports a UE 1310, a base station 1304 supports a UE 1312, a base station 1306 supports a UE 1314, and a base station 1308 supports a UE 1316.

Signal(s) transmitted to a UE other than the UE supported by each base station may be classified as an interference signal at the corresponding UE.

For example, a signal transmitted from the base station 1302 to the UE 1314 may be classified as an interference signal at the UE 1314. In another example, a signal transmitted from the base station 1306 may be classified as an interference signal at the UEs 1312 and 1316.

To efficiently process the interference, a central base station managing the base stations 1302, 1304, 1306, and 1308 may group the base stations 1302, 1304, 1306, and 1308 in such a manner that base stations that do not cause interference between them are included in the same group.

In this case, the central base station may use a graph coloring algorithm. More specifically, the central base station may group the base stations using a vertex coloring algorithm.

The vertex coloring algorithm may mean a scheme of coloring two vertexes connected by sides with different colors. In this case, the number of colors used should be a minimum value.

The vertex coloring algorithm may refer to an algorithm used to represent a correlation (or association) between nodes. For example, the vertex coloring algorithm may be used to represent an interference relationship between pairs each including a base station and a UE constituting each node.

Hence, the group number of base stations (or the number of base station groups) should be a minimum value among numbers that can be grouped. In other words, the number of base station groups may be a chromatic number that means a minimum number of colors required when different colors are assigned to all of adjacent vertexes of a graph so that the adjacent vertexes have different colors.

(b) of FIG. 13 illustrates an example of applying the vertex coloring algorithm to the network topology graph illustrated in (a) of FIG. 13.

In (b) of FIG. 13, a vertex may mean a combination (or a pair) of a base station and a UE that transmit and receive a signal that is not grouped due to inter-interference. In other words, the vertex may mean a pair of a specific base station and a UE existing in a cell supported by the specific base station.

That is, a vertex 1318 may mean a combination of the base station 1302 and the UE 1310, a vertex 1320 may mean a combination of the base station 1304 and the UE 1312, a vertex 1322 may mean a combination of the base station 1306 and the UE 1314, and a vertex 1324 may mean a combination of the base station 1308 and the UE 1316.

A line connecting the vertexes may mean an interference relationship between the base stations and/or the UEs included in the vertexes.

For example, the vertex 1318 has an interference relationship with the vertexes 1322 and 1324. More specifically, since the base station 1302 transmits an interference signal to the UE 1314, the vertex 1318 and the vertex 1322 are connected to each other. Further, since the UE 1310 receives an interference signal from the base station 1308, the vertex 1318 and the vertex 1324 are connected to each other.

In another example, the vertex 1324 has an interference relationship with the vertexes 1318 and 1322. More specifically, since the base station 1308 transmits an interference signal to the UE 1310, the vertex 1324 and the vertex 1318 are connected to each other. Further, since the UE 1316 receives an interference signal from the base station 1306, the vertex 1324 and the vertex 1322 are connected to each other.

If the above description is applied to all the base stations 1302, 1304, 1306, and 1308, the interference relationship of the base stations and/or the UEs may be represented by a graph illustrated in (b) of FIG. 13.

Here, the vertexes 1318, 1322, and 1324 should be represented in different colors.

However, since the vertex 1320 is connected to only the vertex 1322, the vertex 1320 may be represented in the color of the vertex 1318 or 1324.

Thus, referring to (b) of FIG. 13, the vertex 1320 is represented in the same color as the vertex 1318. However, in other embodiments, the vertex 1320 may be represented in the color of the vertex 1324.

The central base station may group the base stations according to colors applied to the vertexes of the graph illustrated in (b) of FIG. 13.

Referring to (c) of FIG. 13, the base station 1302 included in the vertex 1318 and the base station 1304 included in the vertex 1320 are included in a first group 1326. The base station 1302 and the base station 1304 included in the first group 1326 do not cause interference between them.

Further, the base station 1306 included in the vertex 1322 is included in a second group 1328, and the base station 1308 included in the vertex 1324 is included in a third group 1330.

Accordingly, the base stations 1302, 1304, 1306, and 1308 may be classified into three groups.

FIG. 13 illustrates that the number of base stations and the number of UEs are four by way of example. However, in various embodiments of the present invention, the number of base stations and/or the number of UEs may be variously changed.

FIG. 14 illustrates a method for grouping base stations according to another embodiment of the present invention. FIG. 14 is merely for convenience of explanation and does not limit the scope of the present invention.

Referring to FIG. 14, it is assumed that seven cells are present in a wireless communication system and each cell includes a base station and a UE. That is, it is assumed that seven base stations and seven UEs are present in the wireless communication system.

Referring to (a) of FIG. 14, it is assumed that a UE 1402 is predicted to move through a designated path. In other words, it is assumed that a network topology is constructed considering mobility of the UE 1402 (i.e., when a network topology is constructed through the above-described procedure illustrated in FIG. 6).

In this case, a base station supporting the UE 1402 may predict that the UE 1402 will pass through a particular highway using information (e.g., a map) showing stored terrain features and/or database (DB) for location information of a UE, or the like.

Afterwards, the base station may transmit information generated through the prediction to a central base station.

Hence, as illustrated in (b) of FIG. 14, the central base station may construct a network topology graph using information received from the base station and other base stations.

When the network topology graph is constructed, the central base station may group the base stations using the same method (or using the vertex coloring algorithm) as that illustrated in FIG. 13.

As illustrated in (c) of FIG. 14, the base stations may be classified into a first group 1404, a second group 1406, and a third group 1408.

Here, base stations included in the second group 1406 do not cause interference between them. Further, base stations included in the third group 1408 do not cause interference between them.

As described above, the central base station can group the base stations to process interference between cells using the same channel. Here, the base stations included in the group may mean an orthogonal set that do not cause interference between them.

The central base station groups the base stations and then checks whether interferences can be aligned. Here, a procedure for aligning the interferences may mean a procedure for checking interference for each cell.

FIG. 15 illustrates a method for aligning interferences by a central base station according to an embodiment of the present invention. FIG. 15 is merely for convenience of explanation and does not limit the scope of the present invention.

Referring to FIG. 15, a first group 1502, a second group 1504, and a third group 1506 correspond to the first group 1326, the second group 1328, and the third group 1330 in FIG. 13, respectively.

The number of groups may be represented by 'X(G)'. In FIG. 15, since the group number of base stations is 3, a value of X(G) is 3.

To align interferences, a central base station may confirm (or check) how many groups transmit a signal to a UE of each cell using a network topology graph.

In other words, the central base station may check the number of base station groups connected to each UE using the network topology graph.

In this case, the UE of each cell may receive a signal from up to X(G) groups.

As illustrated in FIG. 15, a UE 1508 receives a signal from the first group 1502 and the third group 1506. Thus, when the number of base station groups connected to the UE 1508 is referred to as 'mA', a value of mA is 2.

A UE 1510 receives a signal from the first group 1502 and the second group 1504. Thus, when the number of base station groups connected to the UE 1510 is referred to as 'mB', a value of mB is 2.

A UE 1512 receives a signal from the first group 1502 and the second group 1504. Thus, when the number of base station groups connected to the UE 1512 is referred to as 'mC', a value of mC is 2. Here, the value of mC is not affected by the fact that the UE 1512 receives a signal from all of two base stations included in the first group 1502.

A UE 1514 receives a signal from the second group 1504 and the third group 1506. Thus, when the number of base station groups connected to the UE 1514 is referred to as 'mD', a value of mD is 2.

After the number of base stations (e.g., mA, mB, mC, and mD) connected to the UE of each cell is checked according to the above-described procedure, the central base station may determine a maximum value among the checked numbers. In this case, the determined maximum value may be referred to as 'In'.

For example, in FIG. 15, since all the values of mA, mB, mC, and mD are 2, a value of m is 2.

The central base station may use a time resource indication matrix, that uses a time slot corresponding to 'm', in order to process interference between the cells.

Here, when any m row vectors are selected among X(G) row vectors, the time resource indication matrix may mean a matrix in which the selected row vectors are linearly independent of each other.

FIG. 16 illustrates an example of a time resource indication matrix according to an embodiment of the present invention. FIG. 16 is merely for convenience of explanation and does not limit the scope of the present invention.

Referring to FIG. 16, the time resource indication matrix may be Vandermonde matrix of X(G)×m (m time slot 1602 in which the number of columns is 'In', and X(G) orthogonal set 1604 in which the number of rows is 'X(G)').

Here, X(G) may mean the number of base station groups classified by a central base station. More specifically, X(G) may mean the minimum number of colors required when applying a vertex coloring algorithm to a network topology graph.

Thus, X(G) row vectors in the Vandermonde matrix may be assigned to the base station groups, respectively.

In this case, the assigned row vectors are linearly independent of each other. For example, row vectors assigned to a first group cannot be sub-vectors of row vectors assigned to a second group.

Further, 'm' may mean a maximum value among the numbers of base stations connected to the UE of each cell. In other words, the UE of each cell may simultaneously receive a signal from up to the m base stations.

Hence, if the base stations transmit the signal to the UE using a fixed time slot for each of m time slots, the UE can clearly receive a desired signal.

As described above, the central base station can process interference between cells using a time resource indication matrix consisting of X(G) row vectors including m elements.

A process for determining, by the central base station, a precoder vector and a decoder vector for processing interference using the determined time resource indication matrix is described in detail below.

FIG. 17 illustrates an example of expressing interference between cells according to an embodiment of the present invention. FIG. 17 is merely for convenience of explanation and does not limit the scope of the present invention.

Referring to FIG. 17, it is assumed that two time slots are used to process interference between four cells each including a base station and a UE.

In this instance, base stations of the same group in a cell may use the same type of time resource indication vector. This is because the base stations included in the same group do not cause interference between them.

On the contrary, since interference may be caused between different groups, a different time resource indication vector should be assigned (used) for each group of the base stations.

Here, the time resource indication vector may mean a vector representing a time slot used when the base station transmits a symbol to the UE.

Further, the time resource indication vector may mean one row vector (e.g., 1×m row vctor) included in Vandermonde matrix illustrated in FIG. 16. In other words, the time resource indication matrix may consist of time resource indication vectors assigned to each group.

In FIG. 17, a first group including base stations 1702 and 1704 transmits a signal (or symbol) to at least one UE using a first transmission time slot 1718. In other words, a base station (the base stations 1702 and 1704) of the first group may transmit a signal to a UE using a time resource indication vector A(XA=[1 0]).

In this case, a signal transmitted by the base station 1702 may be referred to as 's1', and a signal transmitted by the base station 1704 may be referred to as 's2'.

Further, a second group including a base station 1706 transmits a signal to at least one UE using a second transmission time slot 1720. In other words, a base station (the base station 1706) of the second group may transmit a signal to a UE using a time resource indication vector B(XB=[0 1]).

In this case, a signal transmitted by the base station 1706 may be referred to as 's3'.

Further, a third group including a base station 1708 may transmit a signal to at least one UE using the first and second transmission time slots 1718 and 1720. In other words, a base station (the base station 1708) of the third group may transmit a signal to a UE using a time resource indication vector C(XC=[1 1]).

In this case, a signal transmitted by the base station 1708 may be referred to as 's4'.

When the base stations transmit a signal to the UEs through the above-described method, each UE may receive one or more signals in each time slot. In this instance, the UE may receive not only a desired signal (or a signal transmitted from a base station of a cell supporting the corresponding UE) but also an interference signal (or a signal transmitted from a base station of a cell not supporting the corresponding UE).

In FIG. 17, a UE 1710 may receive s1 and s4 in a first receive time slot 1722 and receive s4 in a second receive time slot 1724. Here, s1 is a desired signal transmitted from the base station 1702, and s4 is an interference signal transmitted from the base station 1708.

A UE 1712 may receive s2 in the first receive time slot 1722 and receive s3 in the second receive time slot 1724.

Here, s2 is a desired signal transmitted from the base station 1704, and s3 is an interference signal transmitted from the base station 1706.

A UE 1714 may receive s1 and s2 in the first receive time slot 1722 and receive s3 in the second receive time slot 1724. Here, s1 is an interference signal transmitted from the base station 1702, s2 is an interference signal transmitted from the base station 1704, and s3 is a desired signal transmitted from the base station 1706.

A UE 1716 may receive s4 in the first receive time slot 1722 and receive s3 and s4 in the second receive time slot 1724. Here, s3 is an interference signal transmitted from the base station 1706, and s4 is an interference signal transmitted from the base station 1708.

FIG. 17 illustrates an example where a signal received by the UE is simply expressed in character form. However, a signal received by the UE may be expressed in vector form.

Hence, an assignment relationship between a desired signal and an interference signal received by each UE can be more clearly expressed.

FIG. 18 illustrates another example of expressing interference between cells according to an embodiment of the present invention. FIG. 18 is merely for convenience of explanation and does not limit the scope of the present invention.

Referring to FIG. 18, signals received by each UE are expressed in vector form. Further, it is assumed that time resource indication vectors assigned to grouped base stations are linearly independent of each other.

In arrows representing received signals, a solid line arrow denotes a desired signal, and a dotted line arrow denotes an interference signal. In this case, signals received by each UE may mean signals received via a first receive time slot and a second receive time slot.

A UE 1810 receives from a base station 1802 a first desired signal 1818 to which XA=[1 0] is applied, and receives from a base station 1808 a first interference signal 1820 to which XC=[1 1] is applied. In this case, the first desired signal 1818 and the first interference signal 1820 are linearly independent of each other. In other words, the first desired signal 1818 cannot be a sub-vector of the first interference signal 1820.

Hence, the UE 1810 can apply (or use or project) a vector included in a null space of XC to the received signals to remove the first interference signal 1820 and to decode only the first desired signal 1818.

A UE 1812 receives from a base station 1804 a second desired signal 1822 to which XA=[1 0] is applied, and receives from a base station 1806 a second interference signal 1824 to which XB=[0 1] is applied. In this case, the second desired signal 1822 and the second interference signal 1824 are linearly independent of each other. In other words, the second desired signal 1822 cannot be a sub-vector of the second interference signal 1824.

Hence, the UE 1812 can apply a null space vector of XB to the received signals to remove the second interference signal 1824 and to decode only the second desired signal 1822.

A UE 1814 receives from the base station 1806 a third desired signal 1826 to which XB=[0 1] is applied, and receives from the base stations 1802 and 1804 third interference signals 1828 to which XA=[1 0] is applied.

The third interference signals 1828 may include two aligned interference signals. The two signals are signals to which the same time resource indication vector is applied, and as a result, may have a sub-vector relation between them.

In this case, the third desired signal 1826 and the third interference signals 1828 are linearly independent of each other. In other words, the third desired signal 1826 cannot be a sub-vector of the third interference signals 1828.

Hence, the UE 1814 can apply a null space vector of XA to the received signals to remove the third interference signals 1828 and to decode only the third desired signal 1826.

A UE 1816 receives from the base station 1806 a fourth desired signal 1830 to which XC=[1 1] is applied, and receives from the base station 1806 a fourth interference signal 1832 to which XB=[0 1] is applied. In this case, the fourth desired signal 1830 and the fourth interference signal 1832 are linearly independent of each other. In other words, the fourth desired signal 1830 cannot be a sub-vector of the fourth interference signal 1832.

Hence, the UE 1816 can apply a null space vector of XB to the received signals to remove the fourth interference signal 1832 and to decode only the fourth desired signal 1830.

As described above, each UE can decode signals using a null space vector of a time resource indication vector applied (or assigned) to a group causing interference. Hence, each UE can remove (or process) an interference signal and decode only a desired signal.

Accordingly, the central base station can determine a precoder vector (or a time resource indication vector) used in a base station of each cell and a decoder vector used in a UE of each cell according to the above-described procedures, in order to process interference between cells.

Afterwards, the central base station may transmit information of the determined precoder vector and decoder vector to the base station of each cell. In this case, the central base station may use X2 interface or any connection path between the base stations.

Each base station receiving the information may transmit a signal to the UE using a precoder assigned to each base station. Each base station may transmit information of the corresponding decoder vector to the UE supported by the base station. In this case, the base station may use higher layer signaling or downlink control information (DCI).

Afterwards, each UE may decode a signal transmitted from at least one base station using the decoder vector.

According to the above-described procedures, interference between cells using the same channel can be removed or processed.

FIG. 19 illustrates an operation flow diagram of a base station for processing interference according to an embodiment of the present invention. FIG. 19 is merely for convenience of explanation and does not limit the scope of the present invention.

Referring to FIG. 19, it is assumed that a base station of each cell supports a UE in a coverage of each cell, and a central base station controls one or more base stations.

A procedure illustrated in FIG. 19 may be performed by the central base station.

In step S1905, a base station may determine a first base station group and a second base station group based on a network topology graph.

In this case, the network topology graph may be determined using mobility information of a UE supported by at least one of the first base station group or the second base station group.

Further, the base station may use a vertex coloring algorithm to determine the first base station group and the second base station group.

For example, the base station may determine a graph including, as nodes, a plurality of pairs consisting of a plurality of base stations and a plurality of UEs and apply the vertex coloring algorithm to the determined graph to determine the first base station group and the second base station group.

In step S1910, the base station may determine a first precoder vector for the first base station group and a second precoder vector for the second base station group.

Here, the first precoder vector is linearly independent of the second precoder vector.

The first precoder vector may represent a time resource used in signal transmission of the first base station group, and the second precoder vector may represent a time resource used in signal transmission of the second base station group.

The base station may determine the number of base station groups connected to the UE included in each cell using the network topology graph. The base station may determine the number of time resources used in the signal transmission of the first base station group and the second base station group using a maximum value among the determined numbers. In this case, the first precoder vector and the second precoder vector may be included in a time resource indication matrix based on the determined number of time resources.

In this case, row vectors of the time resource indication matrix have a linearly independent relation between them. Hence, the first precoder vector and the second precoder vector may be row vectors of the time resource indication matrix.

In step S1915, the base station may transmit the first precoder vector and a first decoder vector to the first base station group, and may transmit the second precoder vector and a second decoder vector to the second base station group.

The first decoder vector may be included in a null space of the second precoder vector, and the second decoder vector may be included in a null space of the first precoder vector.

The first decoder vector may be transmitted to at least one UE supported by the first base station group, and the second decoder vector may be transmitted to at least one UE supported by the second base station group.

Overview of Device to which the Present Invention is Applicable

FIG. 20 illustrates a block configuration diagram of a wireless communication device according to an embodiment of the present invention.

Referring to FIG. 20, a wireless communication system includes a network node 2010 and a plurality of UEs 2020.

The network node 2010 includes a processor 2011, a memory 2012, and a communication module 2013. The processor 2011 implements functions, processes, and/or methods proposed in FIGS. 1 to 19. Layers of wired/wireless interface protocol may be implemented by the processor 2011. The memory 2012 is connected to the processor 2011 and stores various types of information for driving the processor 2011. The communication module 2013 is connected to the processor 2011 and transmits and/or receives wired/wireless signals. In particular, if the network node 2010 is a base station, the communication module 2013 may include a radio frequency (RF) unit for transmitting/receiving a radio signal.

The UE 2020 includes a processor 2021, a memory 2022, and a communication module (or RF unit) 2023. The processor 2021 implements functions, processes, and/or methods proposed in FIGS. 1 to 19. Layers of a radio interface protocol may be implemented by the processor 2021. The memory 2022 is connected to the processor 2021 and stores various types of information for driving the processor 2021. The communication module 2023 is connected to the processor 2021 and transmits and/or receives a radio signal.

The memories 2012 and 2022 may be inside or outside the processors 2011 and 2021 and may be connected to the processors 2011 and 2021 through various well-known means. Further, the network node 2010 (in case of the base station) and/or the UE 2020 may have a single antenna or multiple antennas.

The above-described embodiments are results in which the elements and characteristics of the present invention are combined in a specific form. Each of the element or characteristics has to be considered as being optional unless otherwise explicitly described. Each of the elements or characteristics may be implemented in such a way as not to be combined with other elements or characteristics. Furthermore, some of the elements and/or the characteristics may be combined to form an embodiment of the present invention. Order of the operations described in the embodiments of the present invention may be changed. Some of the elements or characteristics of one embodiment may be included in the other embodiment or may be replaced with elements or characteristics corresponding to the other embodiment. It is evident that in the claims, embodiments may be constructed by combining claims not having an explicit citation relation or the claims not having an explicit citation relation may be included in a new claim according to amendments after an application.

The embodiments of the present invention may be implemented by various means, for example, hardware, firmware, software, or any combinations thereof. For hardware implementation, methods according to embodiments of the present disclosure described herein may be implemented by one or more of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

For firmware or software implementation, the methods according to embodiments of the present disclosure may be implemented in the form of a module, a procedure, a function, or the like, performing the foregoing functions or operations. Software codes may be stored in a memory unit and driven by a processor. The memory unit may be positioned within or outside of the processor and exchange data with the processor through various known means.

The present invention may be materialized in a specific form without departing from the spirit and essential characteristics of the present invention. Accordingly, the detailed description should not be interpreted as being limited from all aspects, but should be considered as being illustrative. The scope of the present invention should be determined by reasonable analysis of the attached claims, and all changes within an equivalent range of the present invention fall within the scope of the present invention. Furthermore, in the claims, embodiments may be constructed by combining claims not having an explicit citation relation or the claims not having an explicit citation relation may be included in a new claim according to amendments after an application.

INDUSTRIAL APPLICABILITY

Although a scheduling and interference processing method in a wireless communication system according to the present invention has been described focusing on examples applying to the 3GPP LTE/LTE-A system, it can be applied to various wireless communication systems other than the 3GPP LTE/LTE-A system.

The invention claimed is:

1. A method for processing, by a base station, interference in a wireless communication system, the method comprising:
   receiving interference information about a user equipment (UE) from at least one other base station,
   wherein the interference information is determined based on a location of the UE predicted based on i) location information representing a current location of the UE, ii) mobility information related to a moving path of the UE, iii) velocity information representing a velocity of the UE, and iv) surrounding situation information related to a surrounding environment of the UE;
   configuring network topology information consisting of a sum of respective network topologies determined per each segment of a specific time using the received interference information,
   determining a first base station group and a second base station group based on the network topology information;
   determining a first precoder vector for the first base station group and a second precoder vector for the second base station group,
   wherein the first precoder vector is linearly independent of the second precoder vector; and
   transmitting, to the first base station group, the first precoder vector, and a first decoder vector and to the second base station group, the second precoder vector and a second decoder vector,
   wherein the first decoder vector is included in a null space of the second precoder vector, and the second decoder vector is included in a null space of the first precoder vector.

2. The method of claim 1, wherein determining the first base station group and the second base station group includes determining the first base station group and the second base station group is based on a vertex coloring algorithm.

3. The method of claim 1, further comprising:
   determining a number of base station groups, from which the UE receives at least one of a desired signal or an interference signal, using the configured network topology information;
   determining a maximum value among the determined number of base station groups; and
   determining a number of time resources used in a signal transmission of the first base station group and the second base station group based on the determined maximum value.

4. The method of claim 3, further comprising:
   determining a matrix indicating the time resources based on the determined number of time resources, wherein the first precoder vector and the second precoder vector are determined based on the matrix.

5. The method of claim 4, wherein the first precoder vector and the second precoder vector each include a row vector from the matrix.

6. The method of claim 1,
   wherein the interference information includes information about a base station causing dominant interference in each segment of the specific time, and
   wherein the dominant interference is determined based on the predicted location of the UE for each segment of the specific time and geographical information that is previously stored in at least one second base station.

7. The method of claim 1, wherein the configuring of the network topology information comprises:
   determining a network topology for the specific time based on the network topology determined per each segment of the specific time and a previously configured threshold value.

8. The method of claim 7, wherein the determining of the network topology for each segment of the specific time comprises:
   determining overlapped sections between the interference information received from the at least one other base station; and
   determining the network topology for each segment of the specific time by configuring respective network topologies for the overlapped sections based on interference information about the overlapped sections.

9. The method of claim 7, wherein the determining of the network topology for the specific time comprises:
   deciding whether a length of each segment of the specific time is greater than the previously configured threshold value; and
   configuring network topology information for the specific time based on at least one network topology for at least one segment of the specific time, of which a length is greater than the previously configured threshold value, among the segments of the specific time according the decision.

10. A method for performing, by a first base station, scheduling based on interference information of a user equipment (UE) in a wireless communication system, the method comprising:
    receiving, from at least one second base station, the interference information about the UE,
    wherein the interference information is determined based on a location of the UE predicted based on i) location information representing a current location of the UE, ii) mobility information related to a moving path of the UE, iii) velocity information representing a velocity of the UE, and iv) surrounding situation information related to a surrounding environment of the UE;
    configuring network topology information consisting of a sum of respective network topologies determined per each segment of a specific time based on the received interference information; and
    transmitting, to the at least one second base station, resource information that is scheduled based on the configured network topology information,
    wherein the configuring of the network topology information comprises determining a network topology for the specific time based on a network topology determined per each segment of the specific time and a previously configured threshold value.

11. The method of claim 10,
    wherein the interference information includes information about a base station causing a dominant interference for each segment of the specific time, and
    wherein the dominant interference is determined using the predicted location of the UE for each segment of the specific time and geographical information that is previously stored in the at least one second base station.

12. The method of claim 10, wherein the determining of the network topology for each segment of the specific time comprises:

determining overlapped sections between the interference information received from at least one other base station; and determining the network topology for each segment of the specific time by configuring respective network topologies for the overlapped sections using interference information about the overlapped sections.

13. The method of claim 10, wherein the determining of the network topology for the specific time comprises:

deciding whether a length of each segment of the specific time is greater than the previously configured threshold value; and configuring network topology information for the specific time based on at least one network topology for at least one segment of the specific time, of which a length is greater than the previously configured threshold value, among the segments of the specific time according the decision.

14. The method of claim 10, further comprising:

determining the first base station and the at least one second base station as a first base station group and a second base station group based on the configured network topology information;

determining a first precoder vector for the first base station group and a second precoder vector for the second base station group, wherein the first precoder vector is linearly independent of the second precoder vector; and transmitting, to the first base station group, the first precoder vector and a first decoder vector and to the second base station group, the second precoder vector and a second decoder vector, wherein the first decoder vector is included in a null space of the second precoder vector, and the second decoder vector is included in a null space of the first precoder vector.

15. The method of claim 14, wherein the determining of the first base station and the at least one second base station as the first base station group and the second base station group comprises determining the first base station group and the second base station group based on a vertex coloring algorithm.

16. The method of claim 14, further comprising:

determining a number of base station groups connected the UE based on the configured network topology information;

determining a maximum value among the determined number of base station groups; and determining a number of time resources used in a signal transmission of the first base station group and the second base station group based on the determined maximum value.

17. The method of claim 16, further comprising:

determining a matrix indicating the time resources using the determined number of time resources, wherein the first precoder vector and the second precoder vector are determined based on the matrix.

18. The method of claim 17, wherein the first precoder vector and the second precoder vector each include a row vector of the matrix.

\* \* \* \* \*